(12) United States Patent
Takashima et al.

(10) Patent No.: US 9,799,242 B2
(45) Date of Patent: Oct. 24, 2017

(54) PERSONAL DIGITAL ASSISTANT APPARATUS

(71) Applicant: SONY MOBILE COMMUNICATIONS INC., Minato-ku (JP)

(72) Inventors: Kouichiro Takashima, Tokyo (JP); Kazuhiro Kato, Tokyo (JP); Takao Yagi, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 447 days.

(21) Appl. No.: 13/759,498

(22) Filed: Feb. 5, 2013

(65) Prior Publication Data
US 2013/0208510 A1 Aug. 15, 2013

Related U.S. Application Data

(60) Provisional application No. 61/598,998, filed on Feb. 15, 2012.

(51) Int. Cl.
*F21V 7/04* (2006.01)
*G09F 13/04* (2006.01)
(Continued)

(52) U.S. Cl.
CPC ............ *G09F 13/04* (2013.01); *G02B 6/0065* (2013.01); *G02B 6/0086* (2013.01); *G02B 6/0091* (2013.01); *G02B 6/0093* (2013.01); *G02F 2001/13332* (2013.01); *G02F 2001/133311* (2013.01); *G02F 2001/133314* (2013.01); *G02F 2001/133317* (2013.01);
(Continued)

(58) Field of Classification Search
CPC ......... G02F 1/133314; G02F 1/133317; G02F 1/13332; G02F 1/133325; G02F 1/133328; G02F 2001/133314; G02F 2001/133317; G02F 2001/13332; G02F 2001/133325; G02F 2001/133328; G02F 2001/133311; G02F 2202/28; G02B 6/0065; G02B 6/0093; G09F 2013/1881; G09F 2013/0445; G09F 13/0413; F21V 31/04; F21V 31/005; F21V 21/0808; F21V 17/101; F21V 19/005
USPC .................. 362/632, 633, 634; 156/293, 295
See application file for complete search history.

(56) References Cited

U.S. PATENT DOCUMENTS 5,406,399 A * 4/1995 Koike ............... G02F 1/133308
349/58
7,192,177 B2 * 3/2007 Chang et al. .................. 362/631
(Continued)

FOREIGN PATENT DOCUMENTS

JP 2006-106063 4/2006

*Primary Examiner* — Bryon T Gyllstrom
*Assistant Examiner* — James Endo
(74) *Attorney, Agent, or Firm* — Oblon, McClelland, Maier & Neustadt, L.L.P.

(57) ABSTRACT

An information processing apparatus including a display portion; a backlight unit configured to irradiate light from a rear face side of the display portion; a rear frame having height equivalent to at least a thickness of the backlight unit, and configured to protect the backlight unit; and an outer circumference casing attached to the rear frame, or formed integrally with the rear frame, and provided along an outer circumference of the display portion.

14 Claims, 27 Drawing Sheets

(51) Int. Cl.
*F21V 8/00* (2006.01)
*G02F 1/1333* (2006.01)

(52) U.S. Cl.
CPC ............ *G02F 2001/133325* (2013.01); *G02F 2001/133328* (2013.01); *G02F 2202/28* (2013.01)

(56) References Cited

U.S. PATENT DOCUMENTS

| | | | | |
|---|---|---|---|---|
| 7,817,220 | B2* | 10/2010 | Suh et al. | 349/58 |
| 2003/0123258 | A1* | 7/2003 | Nitto | G02B 6/0068 362/373 |
| 2005/0259443 | A1* | 11/2005 | Lin | G02B 6/0091 362/632 |
| 2006/0119761 | A1* | 6/2006 | Okuda | 349/58 |
| 2006/0139507 | A1* | 6/2006 | Lin | G02F 1/133308 349/58 |
| 2006/0260168 | A1* | 11/2006 | Yang | G06F 1/1601 40/700 |
| 2007/0115692 | A1* | 5/2007 | Yao | 362/632 |
| 2008/0018823 | A1* | 1/2008 | Wang | G02F 1/133308 349/58 |
| 2008/0094535 | A1* | 4/2008 | Suh et al. | 349/58 |
| 2008/0212316 | A1* | 9/2008 | Routledge | F21V 3/04 362/227 |
| 2008/0284939 | A1* | 11/2008 | Lee et al. | 349/58 |
| 2009/0067112 | A1* | 3/2009 | Takabayashi | G02F 1/13452 361/220 |
| 2009/0079894 | A1* | 3/2009 | Okuda | G02F 1/133308 349/58 |
| 2009/0185100 | A1* | 7/2009 | Matsuhira | G02B 6/005 349/58 |
| 2009/0237592 | A1* | 9/2009 | Mizutani | 349/62 |
| 2010/0118229 | A1* | 5/2010 | Kim | B29C 45/14065 349/64 |
| 2010/0123850 | A1* | 5/2010 | Miyashita | G02F 1/133308 349/58 |
| 2010/0246163 | A1* | 9/2010 | Chen et al. | 362/97.1 |
| 2011/0211140 | A1* | 9/2011 | Kim | G02F 1/133308 349/61 |
| 2012/0063167 | A1* | 3/2012 | Ozawa et al. | 362/609 |
| 2012/0092582 | A1* | 4/2012 | Oohira | 349/58 |
| 2012/0140141 | A1* | 6/2012 | Lee | G02B 6/005 349/59 |
| 2012/0162565 | A1* | 6/2012 | Lee | G02F 1/133308 349/58 |
| 2012/0169961 | A1* | 7/2012 | Ha et al. | 349/61 |
| 2012/0206680 | A1* | 8/2012 | Onishi | G02F 1/134336 349/122 |
| 2012/0268868 | A1* | 10/2012 | Yoon | G02F 1/133308 361/679.01 |

* cited by examiner

PERSONAL DIGITAL ASSISTANT APPARATUS

CROSS REFERENCE TO RELATED APPLICATION

The present application claims the benefit of the earlier filing date of U.S. Provisional Patent Application Ser. No. 61/598,998 filed on Feb. 15, 2012, the entire contents of which is incorporated herein by reference.

BACKGROUND

Field of the Disclosure

The present disclosure relates to a personal digital assistant apparatus suitable for being applied to electronic equipment including a display unit, for example, such as a cellular phone, a PHS phone (PHS: Personal Handyphone System), a PDA apparatus (PDA: Personal Digital Assistant), an electronic camera device, an electronic video camera device, a portable game machine, a notebook-type personal computer device, or the like. In particular, the present disclosure relates to a personal digital assistant apparatus whereby, of a casing of electronic equipment to which the present disclosure has been applied, the width of a portion called a frame surrounding the display unit can be narrowed (narrow framing).

Description of Related Art

As for cellular phones in today, cellular phones called smart phones, in which a display unit (touch panel) is provided whereby contact operations are available as to a wide area portion of a rectangular casing, are mainstream.

In the case of such cellular phones, a display unit having a somewhat smaller area than the above wide area portion is provided. Therefore, the circumference of the display unit is surrounded with a casing of such a cellular phone. A portion of the casing surrounding this display unit is called a "frame".

FIG. 32 is a diagram illustrating a cross section obtained by cutting away such a cellular phone along the transverse direction.

As illustrated in this FIG. 32, the display unit of this personal digital assistant apparatus is formed by mutually gluing a display unit 100, for example, such as a liquid crystal display unit, organic EL display unit (Organic Electro Luminescence) or the like to a lens 101 via a lamination member 102.

A backlight unit 104 is provided between a rear frame 103 and the display unit 100, and irradiates light on this display unit 100. This backlight unit 104 is surrounded with a backlight frame 105 having generally the same thickness as that of this backlight unit 104. This backlight frame 105 principally protects the backlight unit 104 from force applied in the thickness direction of this cellular phone.

Also, the backlight frame 105 is glued to the display unit 100 via a tape 106, and also glued to a reflector 108 of the backlight unit 104 via a tape 107.

Also, the backlight unit 104 of which the reflector 108 is glued to the backlight frame 105 is configured to come into contact with the rear frame 103 via a cushion sheet 109 at the time of this cellular phone being assembled.

Also, this cellular phone includes a side cabinet 110 and a rear cabinet 111 which make up the outer circumference portion of this cellular phone. The edge portions of the rear cabinet 111 and rear frame 103 are connected to the side cabinet 110 via a tape 112.

Also, an edge portion of the lens 101 of the display unit is mounted onto the side cabinet 110 having a cross-sectional generally L-letter shape as illustrated in FIG. 32 at the time of this cellular phone being assembled.

A portion where the edge portion of the lens 101 of this display unit, and the side cabinet 110 are overlapped is configured to be applied with an adhesive agent 113 using a dispenser apparatus.

Specifically, the adhesive agent 113 is automatically applied to an adhesive agent applied portion 110a of the side cabinet 110 by a dispenser apparatus, and is also automatically applied to an edge portion 101a of the lens 101 of the display portion by a dispenser apparatus 120.

Thus, the display unit and the side cabinet 110 are glued via the adhesive agent 113 at the time of this cellular phone being assembled.

SUMMARY

However, with a conventional cellular phone, as can be understood from FIG. 32, the backlight frame 105 for protecting the backlight unit 104 is provided in a manner overlapped with the display unit 100.

Therefore, it is difficult to irradiate the light from the backlight unit 104 on a portion where the backlight frame 105 and display unit 100 are overlapped. The portion where it is difficult to irradiate the light from the backlight unit 104 causes inconvenience in that a portion that which cannot be used as a display region is formed on the display unit 100.

Also, nowadays, it has been expected to provide a cellular phone of which the portion called the "frame" surrounding the circumference of the display unit is formed as narrowly as possible (narrow framing).

The width of the backlight frame 105 is narrowed, and accordingly, some narrow framing can be realized, but this backlight frame 105 is configured so that the upper and lower sides are glued and fixed with the tape 106 and tape 107 as illustrated in FIG. 32.

It has been difficult to manufacture a tape of which the width is equal to or smaller than 0.8 mm as the tape 106 and tape 107. Therefore, the width of the backlight frame 105 is restricted to 0.8-mm width in accordance with the manufacturing restriction of the tapes, which has been an obstacle for significant narrow framing of a cellular phone.

The inventor of the present disclosure has recognized necessity of a cellular phone whereby the entire display region of the display portion can effectively be used and simultaneously significant narrow framing can be realized.

According to one exemplary embodiment, the disclosure is directed to an information processing apparatus including a display portion; a backlight unit configured to irradiate light from a rear face side of the display portion; a rear frame having height equivalent to at least a thickness of the backlight unit, and configured to protect the backlight unit; and an outer circumference casing attached to the rear frame, or formed integrally with the rear frame, and provided along an outer circumference of the display portion.

According to the present disclosure, the entire display region of the display portion can effectively be used and simultaneously significant narrow framing can be realized.

DETAILED DESCRIPTION

The present disclosure can be applied to a cellular phone as an example.

First Embodiment

[Configuration of Cellular Phone]

Figure 1:
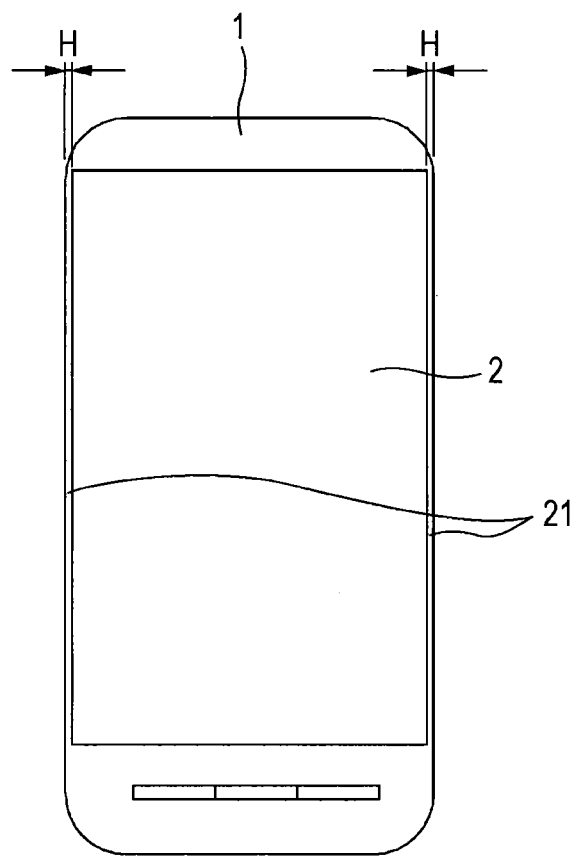
FIG. 1 is a front view of a cellular phone serving as a first embodiment to which the present disclosure has been applied.

FIG. 1 is a front view of a cellular phone serving as a first embodiment of the present disclosure. As illustrated in FIG. 1, the cellular phone according to the present embodiment includes a display portion 2 (touch panel) whereby contact operations can be performed at one wide area portion 1 (or may be both of one and the other) of a long-plate-shaped casing. This display portion 2 has a somewhat smaller area than the wide area portion 1.

Therefore, the circumference of the display portion 2 is surrounded with the casing of this cellular phone. This portion of the casing surrounding the display portion 2 is referred to as "frame".

The cellular phone according to the present embodiment is a cellular phone whereby the width of the portion called as "frame" can be narrowed (narrow framing), as described below.

Figure 2:
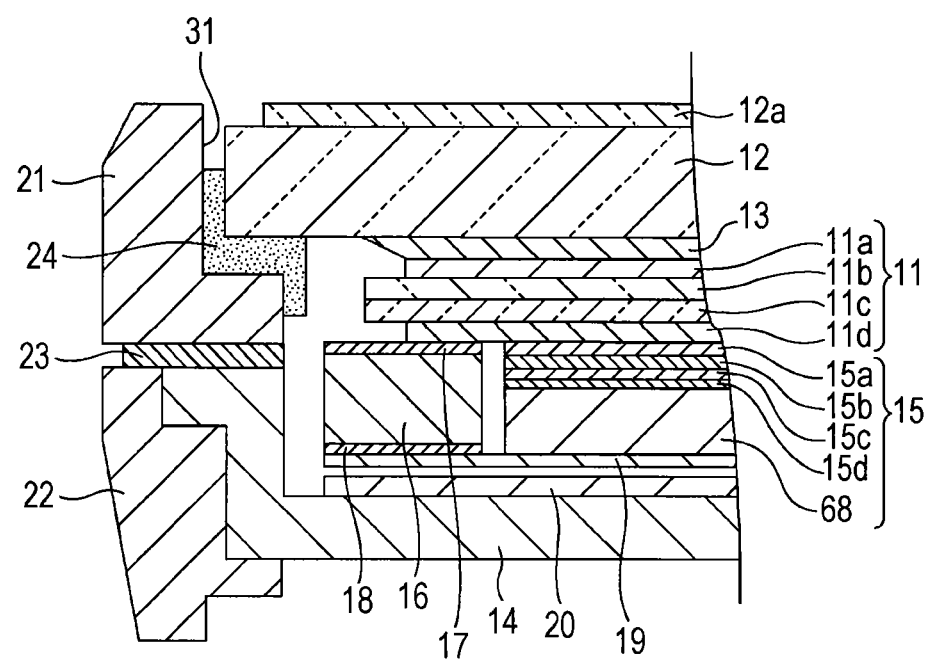
FIG. 2 is a diagram illustrating a cross section obtained by cutting away the cellular phone serving as the first embodiment along the transverse direction.

FIG. 2 is a diagram illustrating a cross section obtained by cutting away such a cellular phone along the transverse direction.

As illustrated in this FIG. 2, the display portion 2 of this personal digital assistant apparatus is formed by mutually gluing a display unit 11, for example, such as a liquid crystal display unit or organic EL display unit (Organic Electro Luminescence) or the like, to a lens 12 to which a scattering prevention film 12*a* is glued on the face portion side where an operator performs contact operations, via a lamination member 13.

The scattering prevention film 12*a* functions so as to prevent an inconvenience of broken pieces of the lens 12 scattering at the time of damage or the like, from occurring at the lens 12. Also, this scattering prevention film 12*a* functions so as to protect the lens 12 from cracks, dust, or the like. Further, this scattering prevention film 12*a* functions so as to improve sliding of a finger or the like at the time of contact operations to improve operability.

The lens 12 functions so as to secure the strength of the display unit 11. Also, with this lens 12, an electrode layer for detecting contact operations is provided.

The display unit 11 is formed by sequentially laminating an upper polarizing plate 11*a*, color filter glass 11*b*, TFT glass 11*c* (TFT: Thin Film Transistor), and a lower polarizing plate 11*d*. The lens 12 is glued to the upper polarizing plate 11*a* of this display unit 11 via the lamination member 13.

The upper polarizing plate 11*a* functions so as to selectively transmit light with a polarization angle being changed by liquid crystal elements being driven to the upper portion.

The color filter glass 11*b* functions so as to transmit light to be transmitted by converting the light into one color of red, green, and blue. The liquid crystal elements are sealed by this color filter glass 11*b* and TFT glass 11*c*.

With the TFT glass 11*c*, circuits which enable application of different voltage for each place are formed in a grid shape. This TFT glass 11*c* and the color filter glass 11*b* seal the liquid crystal elements.

The lower polarizing plate 11*d* functions so as to have light irradiated toward the liquid crystal elements sealed by the color filter glass 11*b* and TFT glass 11*c* polarize (the direction of light vibration is restricted).

A backlight unit 15 which irradiates light on the display unit 11 is provided between a rear frame 14 and the display unit 11.

This backlight unit 15 is formed by sequentially laminating first through fourth light diffusion films 15*a* through 15*d* of which the light diffusion ratios have each been adjusted, and a light guide 68 which realizes the diffusion and condensing of the light emitted from a light emitting unit, for example, such as a light emitting diode (LED) or the like.

The first through fourth light diffusion films 15*a* through 15*d* function so as to diffuse or condense the light irradiated from the light guide 68.

Such a backlight unit 15 is surrounded by a backlight frame 16 having generally the same thickness as this backlight unit 15. This backlight frame 16 principally protects the backlight unit 15 from force applied in the thickness direction of this cellular phone or the like.

Also, the backlight frame 16 is glued to the display unit 11 via a tape 17, and also glued to a reflector 19 of the backlight unit 15 via a tape 18.

Also, the backlight unit 15 of which the reflector 19 is glued to the backlight frame 16 is configured so as to come into contact with the rear frame 14 via a cushion sheet 20 at the time of this cellular phone being assembled.

Also, this cellular phone has a side cabinet 21 and a rear cabinet 22 which make up the outer circumference portion of this cellular phone.

The side cabinet 21 has a "generally L-letter shaped" cross section as illustrated in FIG. 2, and is formed of a metal member, for example, such as aluminum or titan (titanium) or the like. Therefore, this side cabinet 21 has rigidity as to external shock.

Also, this side cabinet 21 is connected to the edge portions of the rear cabinet 22 and rear frame 14 via a tape 23.

Also, the edge portion of the lens 12 of the display portion 2 is mounted onto the side cabinet 21 having a generally L-letter shaped cross section as illustrated in FIG. 2 at the time of this cellular phone being assembled.

An adhesive agent 24 is arranged to be automatically applied to the edge portion of the lens 12 of the display portion 2, and the side cabinet 21 by the dispenser apparatus.

Specifically, in the case of the cellular phone according to the present embodiment, narrowing is realized by forming the side cabinet 21 using a metal member such as an aluminum member or the like.

In order to automatically apply the viscous adhesive agent 24 to the side cabinet 21 which realizes such narrowing in a seamless manner using the dispenser apparatus, the inner diameter of the nozzle of this dispenser apparatus has to have a certain degree of great diameter.

In the event of having increased the inner diameter of the nozzle of the dispenser apparatus, along therewith, the outer diameter of the nozzle of the dispenser apparatus has also been increased. The width of the adhesive agent 24 at the time of being applied is generally the same as the outer diameter of this nozzle. Also, the center of application of the adhesive agent 24 is set in light of component intersection such as the side cabinet 21 and so forth.

Figure 3A:
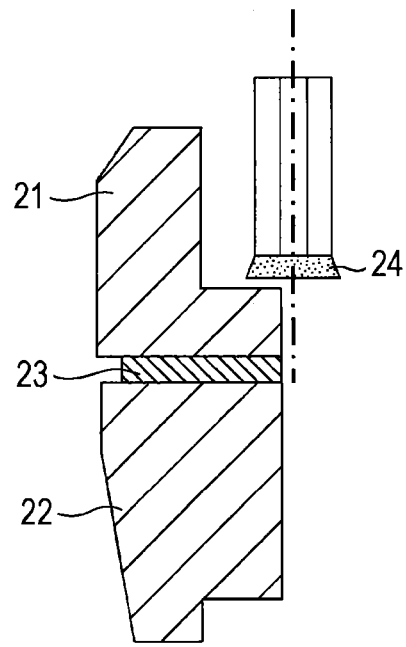
FIGS. 3A and 3B are diagrams describing inconvenience that is caused in the event of applying an adhesive agent to a side cabinet of which narrowing has been realized, and an edge portion of a lens of a display portion using a linear-shaped nozzle of a dispenser apparatus.
Figure 3B:
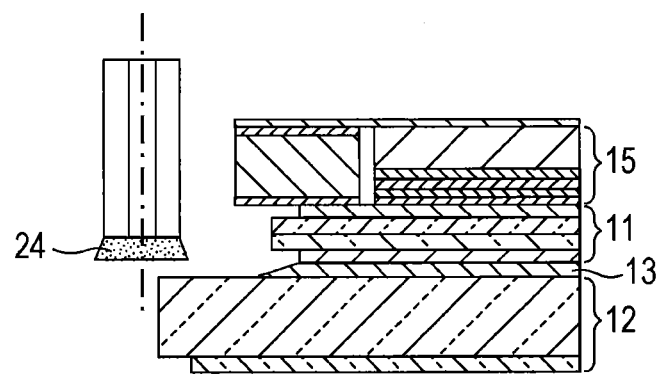

Therefore, in the event of attempting to apply the adhesive agent 24 to the side cabinet 21 which realizes narrowing, using the linear-shaped nozzle of the dispenser apparatus, the center of application of the adhesive agent 24 deviates, as illustrated in a dashed dotted line in A in FIG. 3, from the side cabinet 21, and accordingly, it is difficult to accurately apply the adhesive agent 24.

Also, the edge portion of the lens 12 of the display portion 2 to which the adhesive agent 24 is applied is also the same, the side cabinet 21 is subjected to narrowing, thereby narrowing the portion of the edge portion of the lens 12 overlapped with this side cabinet 21 is also narrowed.

Therefore, in the event of attempting to apply the adhesive agent 24 to the edge portion of the lens 12 of which the portion overlapped with the side cabinet 21 is narrowed using the linear-shaped nozzle of the dispenser apparatus, the center of application of the adhesive agent 24 deviates, as illustrated in a dashed dotted line in B in FIG. 3, from the edge portion of the lens 12, and it is difficult to accurately apply the adhesive agent 24.

Figure 4A:
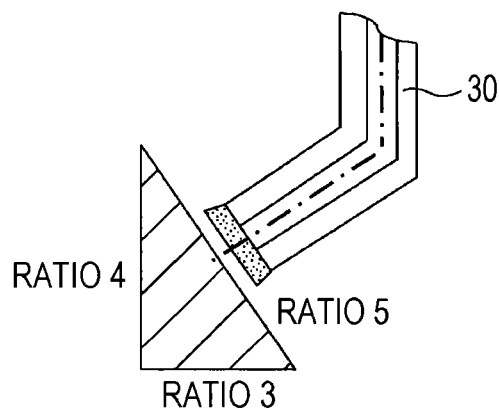
FIGS. 4A-4C are diagrams for describing a dispenser apparatus having a nozzle subjected to bend processing.
Figure 4B:
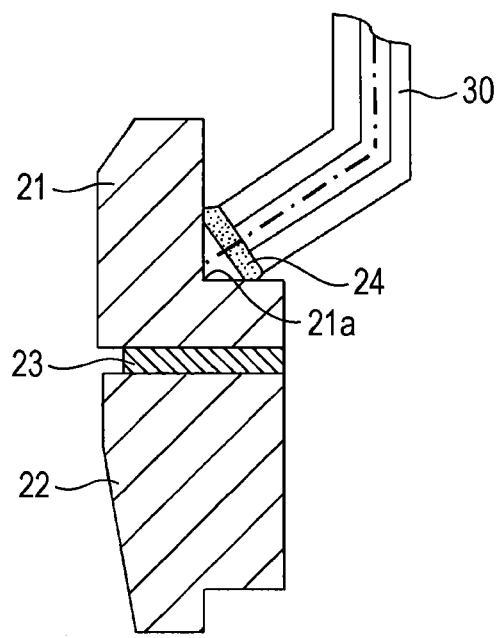
Figure 4C:
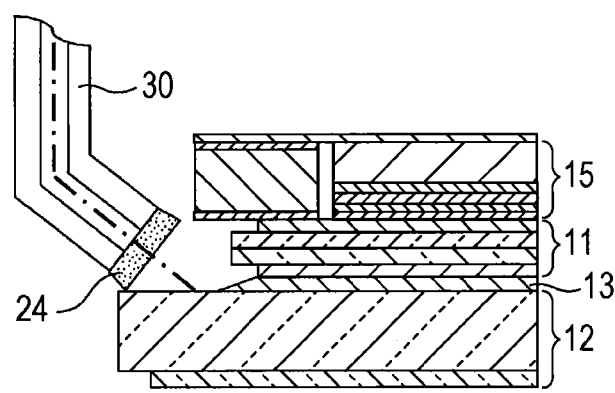

Therefore, as illustrated in A in FIG. 4, a nozzle 30 of a dispenser apparatus which applies an adhesive agent to the cellular phone according to the present embodiment has been subjected to bend processing with the angle of an adhesive agent to be vertically emitted to the oblique side of a right-angled triangle of which the three sides have a proportion of 3:4:5.

In the event of applying the adhesive agent 24 to the side cabinet 21, the adhesive agent 24 is applied to the side cabinet 21 with a corner portion 21*a* of the side cabinet 21 as the center as illustrated in B in FIG. 4, using the nozzle 30 subjected to this bend processing.

Also, in the event of applying the adhesive agent 24 to the edge portion of the lens 12 of the display portion 2, the adhesive agent 24 is obliquely applied to the edge portion of the lens 12 of the display portion 2 as illustrated in C in FIG. 4, using the nozzle 30 subjected to this bend processing.

Figure 5A:
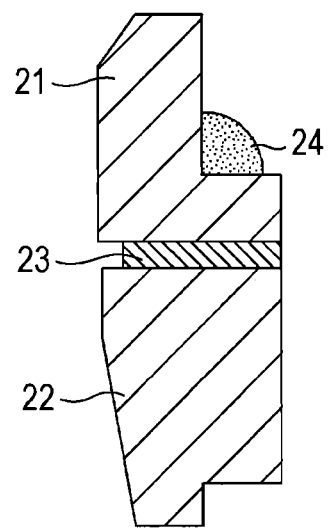
FIGS. 5A and 5B are diagrams illustrating a scene where an adhesive agent is applied to the side cabinet of which narrowing has been realized, and the edge portion of the lens of the display portion using the nozzle subjected to bend processing of the dispenser apparatus.
Figure 5B:
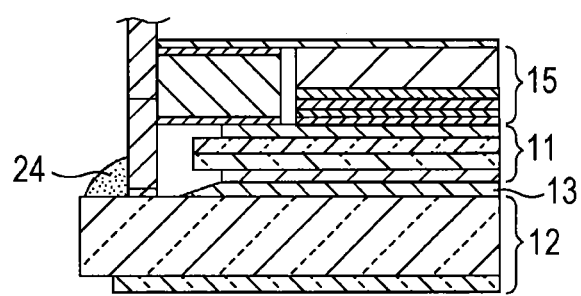
Figure 6A:
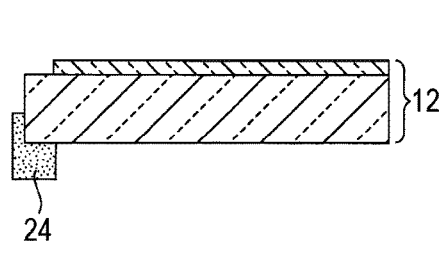
FIGS. 6A-6E are diagrams for describing an assembly process according to a pre-adhesion process of rear cabinet assembly of the cellular phone serving as the first embodiment to which the present disclosure has been applied.
Figure 6B:
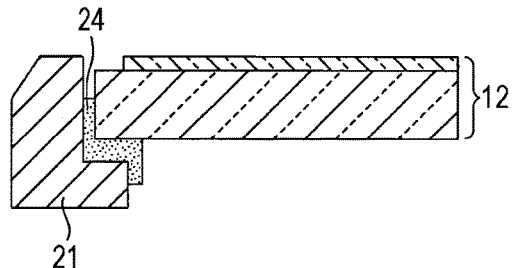
Figure 6C:
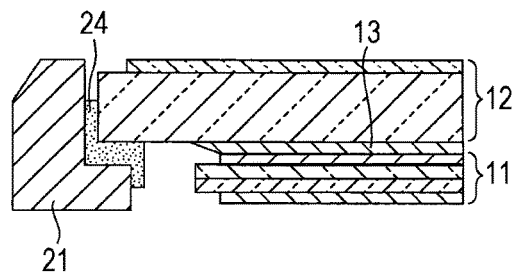
Figure 6D:
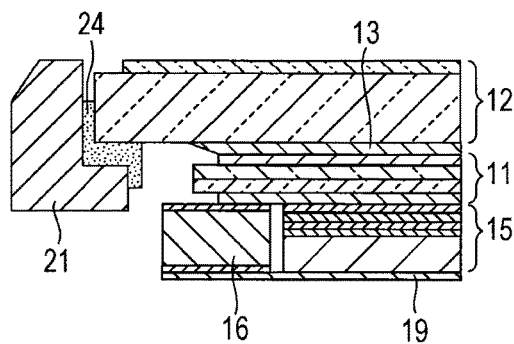
Figure 6E:
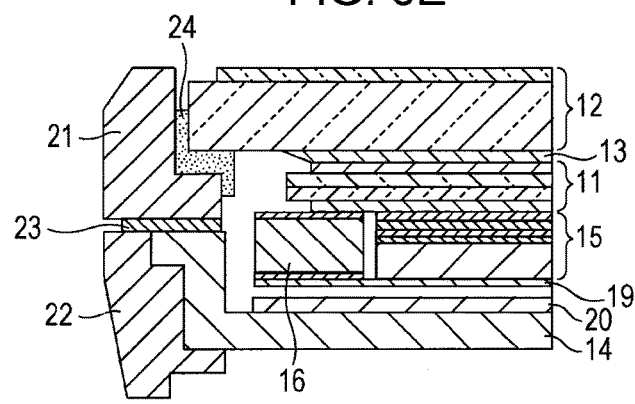
Figure 7A:
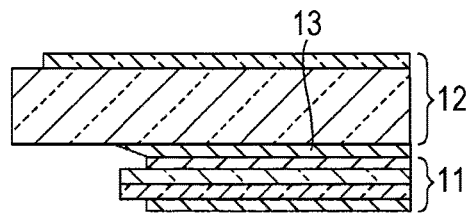
FIGS. 7A-7E are diagrams for describing an assembly process according to a post-adhesion process of rear cabinet assembly of the cellular phone serving as the first embodiment to which the present disclosure has been applied.
Figure 7B:
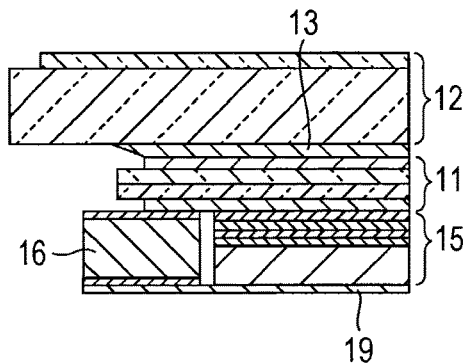
Figure 7C:
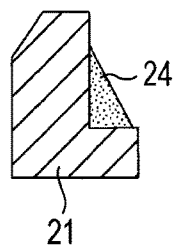
Figure 7D:
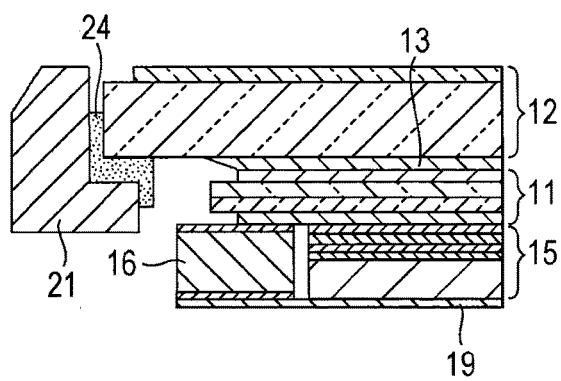
Figure 7E:
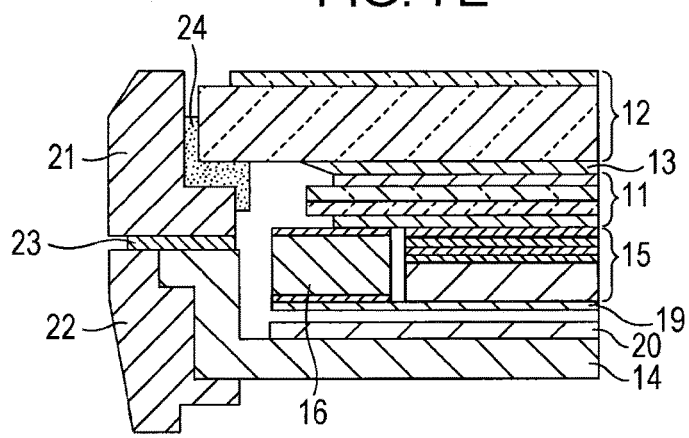

Thus, as illustrated in A in FIG. 5, the adhesive agent 24 can automatically be applied in a manner loaded onto the side cabinet 21 subjected to narrowing. Also, as illustrated in B in FIG. 5, the adhesive agent 24 can also automatically be applied to the edge portion of the lens 12 of the display portion 2 subjected to narrowing in a manner loaded onto the edge portion of this lens 12.

[Assembly Process of Rear Cabinet Assembly]

Next, an assembly process of the rear cabinet assembly of this cellular phone will be described. As the assembly process of the rear cabinet assembly, there are "pre-adhesion process" wherein the lens 12 of the display portion 2, and the side cabinet 21 are previously glued by the adhesive agent 24, and the display unit 11 or backlight unit 15 or the like is then glued thereto, and "post-adhesion process" wherein the display unit 11 or backlight unit 15 or the like is previously glued to the lens 12 of the display portion 2, and this lens 12 and side cabinet 21 are glued by the adhesive agent 24.

[Pre-Adhesion Process]

A in FIG. 6 through E in FIG. 6 illustrate the assembly process of the rear cabinet assembly according to the pre-adhesion process. In the event of assembling the rear cabinet assembly by the pre-adhesion process, first, as illustrated in A in FIG. 6, the adhesive agent 24 is obliquely applied to the edge portion of the lens 12 of the display portion 2 using the nozzle 30 subjected to this bend processing. Also, the adhesive agent 24 is also applied to the side cabinet 21 using the nozzle 30 subjected to this bend processing.

Next, as illustrated in B in FIG. 6, the edge portion of the lens 12 of the display portion 2 to which the adhesive agent 24 has been applied is mounted onto the side cabinet 21 to which the adhesive agent 24 has similarly been applied, and this mounted state is maintained for a predetermined period of time (e.g., one minute to two minutes) using an unshown tool. Thus, the adhesive agent 24 is dried, and accordingly, the lens 12 of the display portion 2, and the side cabinet 21 are glued via the adhesive agent 24.

Next, the display unit 11 is glued to the lens 12 of the display portion 2 glued to the side cabinet 21 via a lamination 13 as illustrated in C in FIG. 6.

Next, as illustrated in D in FIG. 6, the backlight unit 15 is glued to the display unit 11, and the backlight frame 16 is mounted so as to surround this backlight unit 15.

Finally, as illustrated in E in FIG. 6, the cushion sheet 20 is laid between the rear frame 14 and the reflector 19 of the backlight unit 15, and also the rear cabinet 22, and the edge portion of the rear frame 14 are glued to the side cabinet 21 via a tape 23, thereby completing assembly of the rear cabinet assembly.

[Post-Adhesion Process]

Next, A in FIG. 7 through E in FIG. 7 illustrate the assembly process of the rear cabinet assembly according to the post-adhesion process. In the event of assembling the rear cabinet assembly by the post-adhesion process, first, as illustrated in A in FIG. 7, the display unit 11 is glued to the lens 12 of the display portion 2 via the lamination 13.

Next, as illustrated in B in FIG. 7, the backlight unit 15 is glued to the display unit 11, and the backlight frame 16 is mounted so as to surround this backlight unit 15.

Next, as illustrated in C in FIG. 7, the adhesive agent 24 is applied to the side cabinet 21 using the nozzle 30 subjected to this bend processing. Also, the adhesive agent 24 is also applied to the edge portion of the lens 12 of the display portion 2 to which the display unit 11 or backlight unit 15 has been glued, using the nozzle 30 subjected to this bend processing.

Next, as illustrated in D in FIG. 7, the edge portion of the lens 12 of the display portion 2 to which the adhesive agent 24 has been applied is mounted onto the side cabinet 21 to which the adhesive agent 24 has similarly been applied, and this mounted state is maintained for a predetermined period of time (e.g., one minute to two minutes) using an unshown tool. Thus, the adhesive agent 24 is dried, and accordingly, the lens 12 of the display portion 2, and the side cabinet 21 are glued via the adhesive agent 24.

Finally, as illustrated in E in FIG. 7, the cushion sheet 20 is laid between the rear frame 14 and the reflector 19 of the backlight unit 15, and also the rear cabinet 22, and the edge portion of the rear frame 14 are glued to the side cabinet 21 via a tape 23, thereby completing assembly of the rear cabinet assembly.

[Kind and Effects of Adhesive Agent]

Next, an adhesive agent whereby a certain degree of elasticity can be maintained even after hardening is used as the adhesive agent 24. For example, an adhesive agent such as "humidity hardening adhesive agent" which is hardened by moisture, "UV cure adhesive agent" which is hardened by UV, "thermosetting adhesive agent" which is hardened by heat, or the like, can be used as the adhesive agent 24.

"Humidity hardening adhesive agent" is hardened by moisture, and accordingly, workability is excellent, and suitable elasticity can be maintained even after hardening. Therefore, with the cellular phone according to the present embodiment, "humidity hardening adhesive agent" is employed as the adhesive agent 24.

This humidity hardening adhesive agent is applied to the lens 12 of the display portion 2 and the side cabinet 21, and fixed for a certain period of time using a tool as described above, and accordingly, this humidity hardening adhesive agent is hardened by moisture, and the lens 12 of the display portion 2 and the side cabinet 21 are glued.

Here, as described with reference to B in FIG. 4 and C in FIG. 4, in the event that the adhesive agent 24 has been applied to each of the corner 21*a* of the side cabinet 21, and the edge portion of the lens 12 of the display portion 2, and the edge portion of the lens 12 of the display portion 2 has been mounted to the side cabinet 21, the adhesive agent 24 flows into a gap portion 31 between the side cabinet 21 and the edge portion of the lens 12 as illustrated in FIG. 2, and is hardened.

As described above, in the case of the cellular phone according to the present embodiment, "humidity hardening adhesive agent" for maintaining suitable elasticity even after hardening is employed as the adhesive agent 24. Therefore, the adhesive agent 24 flows into the cap portion 31 and is hardened, which is the same as with a case where an elastic member such as the adhesive agent 24 is provided between the side cabinet 21 and the edge portion of the lens 12.

The adhesive agent 24 having this elasticity functions so as to absorb external shock. Therefore, the side cabinet 21 formed of a member with only rigidity being taken into consideration can be employed as the side cabinet 21. Therefore, in the case to the cellular phone according to the present embodiment, the side cabinet 21 formed of a metal member such as aluminum or the like is employed.

In other words, in the case to the cellular phone according to the present embodiment, the rigidity of this cellular phone is secured by employing the side cabinet 21 formed of a metal member, and also, the shock absorbability of this cellular phone is secured by the adhesive agent 24 having elasticity which has flowed into the gap portion 31 between the side cabinet 21 and the edge portion of the lens 12 and has been hardened.

The side cabinet 21 formed of a metal member can be employed, and accordingly, the rigidity of this cellular phone can be secured even in the event of the side cabinet 21 being reduced in size, and according to the side cabinet 21 which has been reduced in size, as illustrated in FIG. 1, a cellular phone having a good design property can be provided by narrowing the width H of a portion called a frame surrounding the circumference of the display portion 2.

[Advantages of First Embodiment]

As is apparent from the above description, with the cellular phone serving as the first embodiment of the present disclosure, the side cabinet 21 is reduced in size by being formed of a metal member, and the adhesive agent 24 is applied to the side cabinet 21 reduced in size using the dispenser apparatus including the nozzle 30 subjected to bend processing. The adhesive agent 24 is obliquely applied to the edge portion of the lens 12 of the display portion 2 using the nozzle 30 subjected to bend processing of this dispenser apparatus.

The edge portion of the lens 12 of the display portion 2 is mounted to the side cabinet 21 to which the adhesive agent 24 has been applied, thereby gluing both.

Thus, the adhesive agent 24 flows into the cap portion 31 between the side cabinet 21 and the edge portion of the lens 12 and is hardened, and this adhesive agent 24 functions so as to absorb external shock.

Therefore, the side cabinet 21 formed of a metal member with only rigidity being taken into consideration can be employed as the side cabinet 21, and the rigidity of this cellular phone can be secured even when reducing the side cabinet 21 in size.

The side cabinet 21 can be reduced in size, and accordingly, the cellular phone having a good design can be provided by narrowing the width H of a portion called a frame surrounding the circumference of the display portion 2 as illustrated in FIG. 1.

Also, the cellular phone according to the present embodiment can secure the rigidity of this cellular phone by employing the side cabinet 21 formed of a metal member, and also secure the shock absorbability of this cellular phone using the adhesive agent 24 having elasticity which has flowed into the gap portion 31 between the side cabinet 21 and the edge portion of the lens 12 and has been hardened.

Second Embodiment

Next, a cellular phone serving as a second embodiment to which the present disclosure has been applied will be described.

The cellular phone according to the first embodiment has been an example wherein the side cabinet 21 having a generally L-letter shape cross section as illustrated in FIG. 2 and so forth.

On the other hand, the cellular phone according to the second embodiment which will be described below is an example wherein an adhesive agent holding unit is provided to the side cabinet 21 so as to fix the applied adhesive agent 24 in a stable manner.

Note that there is difference between the above first embodiment and the second embodiment only in that the adhesive agent holding unit is provided to the side cabinet 21. Therefore, hereafter, only description of this difference will be performed, and redundant description will be omitted.

Figure 8A:
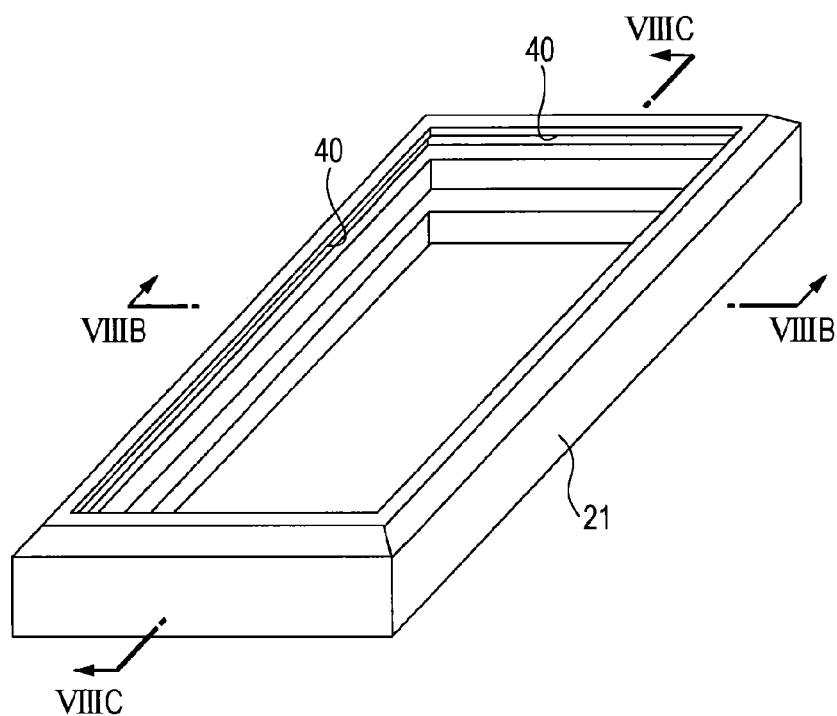
FIGS. 8A-8C are diagrams for describing a groove portion provided to a side cabinet of a cellular phone serving as a second embodiment of the present disclosure.
Figure 8B:
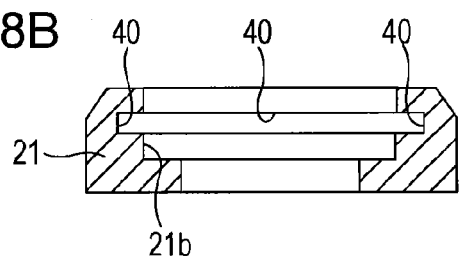
Figure 8C:
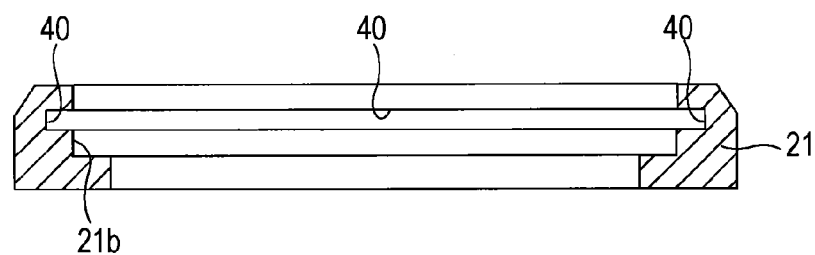

With the cellular phone according to the present second embodiment, a groove portion 40 is provided along the inner circumference of the side cabinet 21 provided so as to surround the outer circumference of the display portion 2 as illustrated in A in FIG. 8.

B in FIG. 8 illustrates a cross section obtained by cutting away the side cabinet 21 to which this groove portion 40 is provided, along line A-A illustrated in A in FIG. 8. Also, C in FIG. 8 illustrates a cross section obtained by cutting away the side cabinet 21 to which this groove portion 40 is provided, along line B-B illustrated in A in FIG. 8.

As can be understood from B in FIG. 8 and C in FIG. 8, the groove portion 40 is consecutively provided along the inner circumference wall portion 21b of the side cabinet 21. This groove portion 40 is configured so as to function as an adhesive agent holding unit for fixing the adhesive agent 24 applied to the side cabinet 21.

Figure 9:
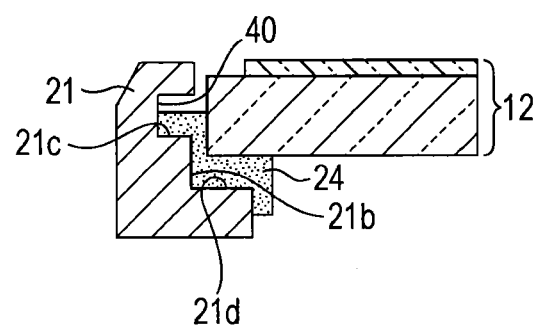
FIG. 9 is a diagram for describing the cross-sectional shape of the side cabinet of the cellular phone serving as the second embodiment of the present disclosure.

Specifically, the groove portion 40 is provided to the side cabinet 21, and accordingly, the cross-sectional shape of the side cabinet 21 forms a staircase shape with a first parallel portion 21c and a second parallel portion 21d being provided to the inner circumference wall portion 21b as illustrated in FIG. 9.

Therefore, in the event of having applied the adhesive agent 24 to this side cabinet 21 using the dispenser apparatus, the applied adhesive agent 24 can be held in a stable manner by the first parallel portion 21c and the second parallel portion 21d as illustrated in FIG. 9.

Also, in the event of having mounted the edge portion of the lens 12 of the display portion 2 to this side cabinet 21, the adhesive agent 24 flows into the groove portion 40. As described above, an adhesive agent whereby predetermined elasticity can be maintained even after hardening is employed as the adhesive agent 24.

Therefore, the cellular phone according to this second embodiment has an elastic member which is even thicker than that of the cellular phone according to the first embodiment by an amount equivalent to that of the adhesive agent 24 flowing into the groove portion 40.

As is apparent from the above description, with the cellular phone according to this second embodiment, the groove portion 40 is provided along the inner circumference of the side cabinet 21. Thus, the cross-sectional shape of the side cabinet 21 can be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 40. Therefore, shock absorbability can be improved as compared to the cellular phone according to the first embodiment, and also the same advantages can be obtained as with the cellular phone according to the first embodiment.

Third Embodiment

Next, a cellular phone serving as a third embodiment to which the present disclosure has been applied will be described.

The cellular phone according to the second embodiment has been an example wherein the groove portion 40 is consecutively provided along the inner circumference of the side cabinet 21.

On the other hand, the cellular phone according to the third embodiment which will be described below is an example wherein a groove portion is intermittently provided along the inner circumference of the side cabinet 21 as an adhesive agent holding unit, and stability of the adhesive agent 24 applied to the side cabinet 21 is realized by this groove portion.

Note that there is difference between the above embodiments and the present third embodiment only in that the groove portion is intermittently provided to the side cabinet 21. Therefore, hereafter, only description of this difference will be performed, and redundant description will be omitted.

Figure 10A:
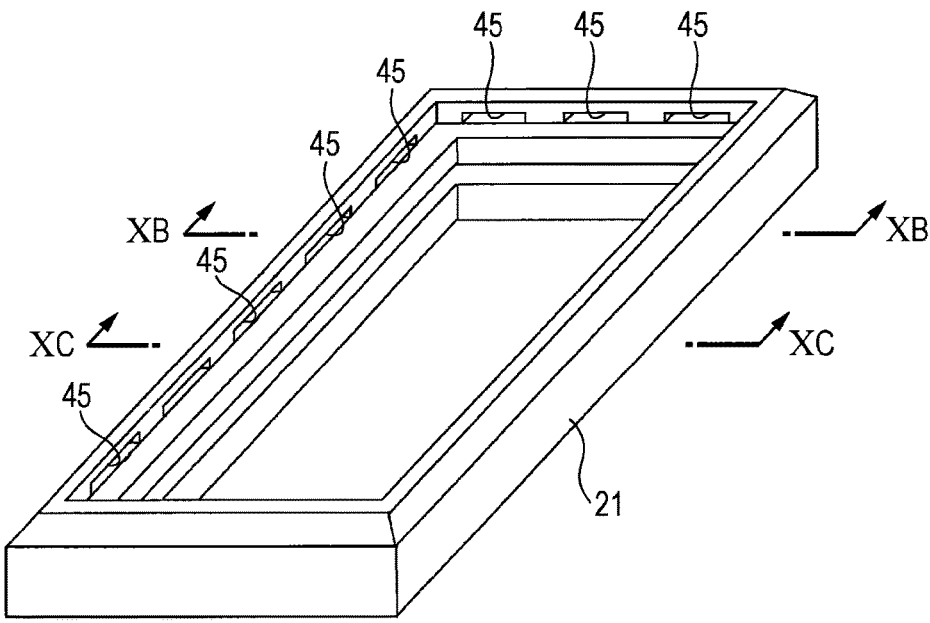
FIGS. 10A-10C are diagrams for describing a groove portion provided to a side cabinet of a cellular phone serving as a third embodiment of the present disclosure.
Figure 10B:
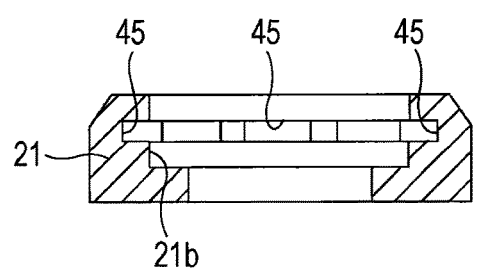
Figure 10C:
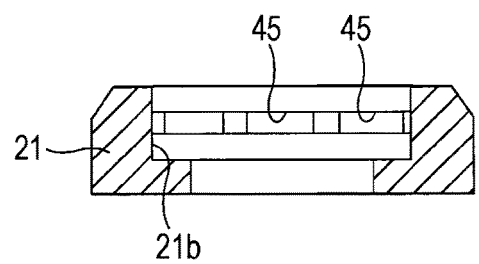

With the cellular phone according to the present third embodiment, a groove portion 45 having a predetermined length is intermittently provided along the inner circumference of the side cabinet 21 provided so as to surround the outer circumference of the display portion 2 as illustrated in A in FIG. 10.

B in FIG. 10 illustrates a cross section (cross-sectional view with line A-A) obtained by cutting away the side cabinet 21 to which this groove portion 45 is provided, at a location where the groove portion 45 is provided as illustrated in A in FIG. 10. Also, C in FIG. 10 illustrates a cross section (cross-sectional view with line B-B) obtained by cutting away the side cabinet 21 at a location where this groove portion 45 is not provided.

As can be understood from B in FIG. 10 and C in FIG. 10, the groove portion 45 is intermittently provided along the inner circumference wall portion 21*b* of the side cabinet 21. This groove portion 45 is configured so as to function as an adhesive agent holding unit for fixing the adhesive agent 24 applied to the side cabinet 21.

Specifically, the cross-sectional shape of the side cabinet 21 where the groove portion 45 is provided forms a staircase shape with a first parallel portion 21*c* and a second parallel portion 21*d* being provided to the inner circumference wall portion 21*b* as illustrated in FIG. 9 described above.

Therefore, in the event of having applied the adhesive agent 24 to this side cabinet 21 using the dispenser apparatus, the applied adhesive agent 24 can be held in a stable manner by the first parallel portion 21*c* and the second parallel portion 21*d* as illustrated in FIG. 9.

Also, in the event of having mounted the edge portion of the lens 12 of the display portion 2 to this side cabinet 21, the adhesive agent 24 flows into the groove portion 45. As described above, an adhesive agent whereby predetermined elasticity can be maintained even after hardening is employed as the adhesive agent 24.

Therefore, the cellular phone according to this third embodiment has an elastic member which is even thicker than that of the cellular phone according to the first embodiment by an amount equivalent to that of the adhesive agent 24 flowing into the groove portion 45.

As is apparent from the above description, with the cellular phone according to this third embodiment, the groove portion 45 is intermittently provided along the inner circumference of the side cabinet 21. Thus, the cross-sectional shape of the side cabinet 21 can intermittently be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 45. Therefore, shock absorbability can be improved as compared to the cellular phone according to the first embodiment, and also the same advantages can be obtained as with the cellular phone according to the first embodiment.

Fourth Embodiment

Next, a cellular phone serving as a fourth embodiment to which the present disclosure has been applied will be described.

The cellular phone according to the second embodiment has been an example wherein the groove portion 40 is consecutively provided along the inner circumference of the side cabinet 21.

On the other hand, the cellular phone according to the fourth embodiment which will be described below is an example wherein a groove portion is consecutively provided along the inner circumference of transverse side portions of the side cabinet 21 as an adhesive agent holding unit, and stability of the adhesive agent 24 applied to the side cabinet 21 is realized by this groove portion.

Note that there is difference between the above embodiments and the present fourth embodiment only in that the groove portion is consecutively provided to the transverse side portions of the side cabinet 21. Therefore, hereafter, only description of this difference will be performed, and redundant description will be omitted.

Figure 11A:
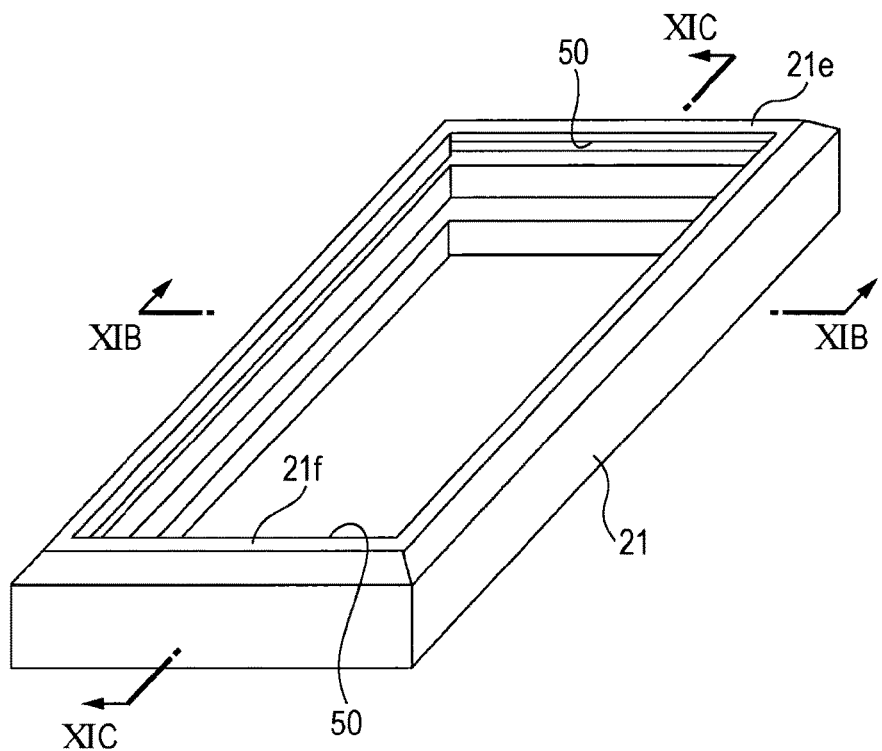
FIGS. 11A-11C are diagrams for describing a groove portion provided to a side cabinet of a cellular phone serving as a fourth embodiment of the present disclosure.
Figure 11B:
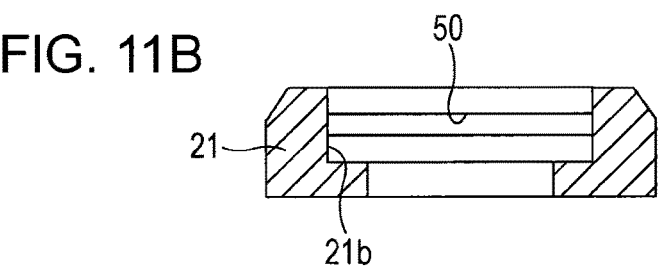
Figure 11C:
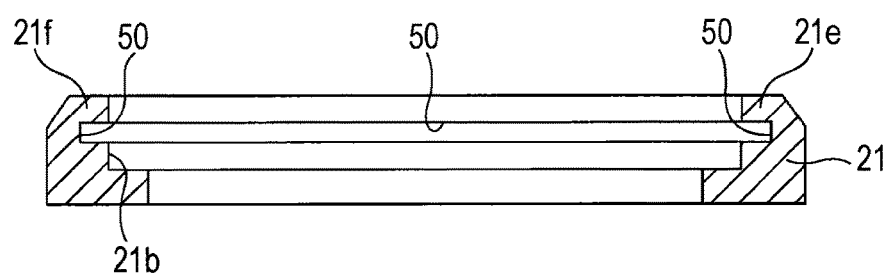
Figure 12A:
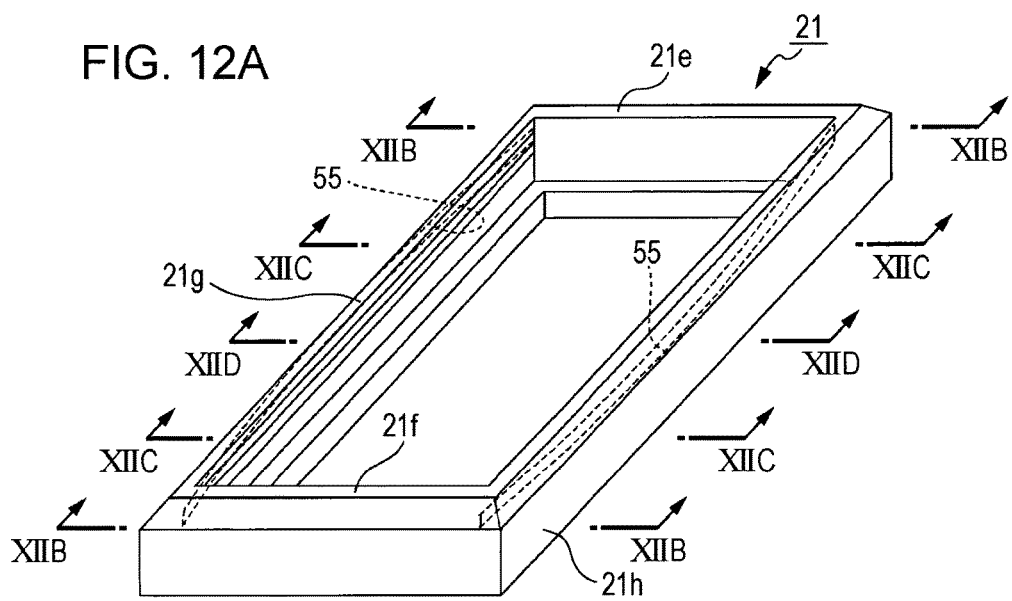
FIGS. 12A-12D are diagrams for describing a groove portion provided to a side cabinet of a cellular phone serving as a fifth embodiment of the present disclosure.
Figure 12B:
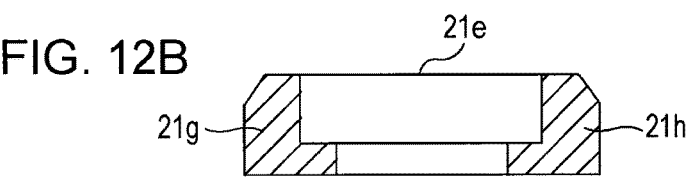
Figure 12C:
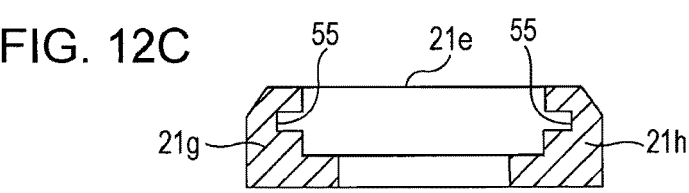
Figure 12D:
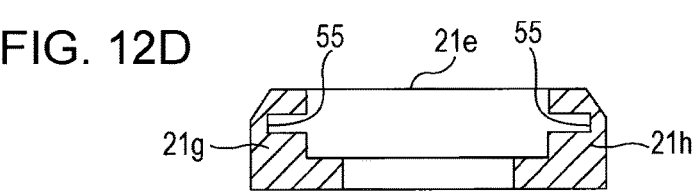

With the cellular phone according to the present fourth embodiment, a groove portion 50 is consecutively (may be intermittently such as the third embodiment) provided along the inner circumference of transverse side portions 21*e* and 21*f* of the side cabinet 21 provided so as to surround the outer circumference of the display portion 2 as illustrated in A in FIG. 11.

B in FIG. 11 illustrates a cross section (cross-sectional view with line A-A) obtained by cutting away the side cabinet 21 where this groove portion 50 is provided, along the transverse direction as illustrated in A in FIG. 11. Also, C in FIG. 11 illustrates a cross section (cross-sectional view with line B-B) obtained by cutting away the side cabinet 21 where this groove portion 50 is provided, along the longitudinal direction as illustrated in A in FIG. 11.

As can be understood from B in FIG. 11 and C in FIG. 11, the groove portion 50 is consecutively provided along the inner circumference wall portion 21*b* of the transverse side portions 21*e* and 21*f* of the side cabinet 21. This groove portion 50 is configured so as to function as an adhesive agent holding unit for fixing the adhesive agent 24 applied to the side cabinet 21.

Specifically, the cross-sectional shape of the side cabinet 21 where the groove portion 50 is provided forms a staircase shape with a first parallel portion 21*c* and a second parallel portion 21*d* being provided to the inner circumference wall portion 21*b* as illustrated in FIG. 9 described above.

Therefore, in the event of having applied the adhesive agent 24 to this side cabinet 21 using the dispenser apparatus, the applied adhesive agent 24 can be held in a stable manner by the first parallel portion 21*c* and the second parallel portion 21*d* as illustrated in FIG. 9.

Also, in the event of having mounted the edge portion of the lens 12 of the display portion 2 to this side cabinet 21, the adhesive agent 24 flows into the groove portion 40. As described above, an adhesive agent whereby predetermined elasticity can be maintained even after hardening is employed as the adhesive agent 24.

Therefore, the cellular phone according to this fourth embodiment has an elastic member which is even thicker than that of the cellular phone according to the first embodiment at the transverse side portions 21*e* and 21*f* of the side cabinet 21 by an amount equivalent to that of the adhesive agent 24 flowing into the groove portion 50.

As is apparent from the above description, with the cellular phone according to the fourth embodiment, the groove portion 50 is consecutively provided along the inner circumference wall portion 21*b* of the transverse side portions 21*e* and 21*f* of the side cabinet 21. Thus, the cross-sectional shapes of the transverse side portions 21*e* and 21*f* of the side cabinet 21 can be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 50. Therefore, shock absorbability can be improved as compared to the cellular phone according to the first embodiment, and also the same advantages can be obtained as with the cellular phone according to the first embodiment.

Fifth Embodiment

Next, a cellular phone serving as a fifth embodiment to which the present disclosure has been applied will be described.

The cellular phone according to the fourth embodiment has been an example wherein the groove portion 50 is consecutively provided along the inner circumference of the transverse side portions 21e and 21f of the side cabinet 21.

On the other hand, the cellular phone according to the fifth embodiment which will be described below is an example wherein a groove portion is consecutively provided along the inner circumference of longitudinal side portions of the side cabinet 21 as an adhesive agent holding unit. This also is an example wherein the depth of this groove portion is deepened as this groove comes closer to the centers of the longitudinal side portions, thereby realizing stability of the adhesive agent 24 applied to the side cabinet 21.

Note that there is difference between the above embodiments and the present fifth embodiment only in that the groove portion is provided to the longitudinal side portions of the side cabinet 21. Therefore, hereafter, only description of this difference will be performed, and redundant description will be omitted.

With the cellular phone according to the present fifth embodiment, a groove portion 55 is consecutively provided along the inner circumference of longitudinal side portions 21g and 21h of the side cabinet 21 provided so as to surround the outer circumference of the display portion 2 as illustrated in A in FIG. 12.

B in FIG. 12 illustrates a cross section (cross-sectional view with line A-A and cross-sectional view with line B-B) obtained by cutting away the side cabinet 21 where this groove portion 55 is provided, along line A-A and line B-B at locations respectively approximate to the transverse side portion 21e and transverse side portion 21f illustrated in A in FIG. 12.

Also, D in FIG. 12 illustrates a cross section (cross-sectional view with line E-E) obtained by cutting away the side cabinet 21 where this groove portion 55 is provided, along line E-E at locations serving as the centers of the transverse side portion 21e and transverse side portion 21f illustrated in A in FIG. 12.

C in FIG. 12 illustrates a cross section (cross-sectional view with line C-C and cross-sectional view with line D-D) obtained by cutting away the side cabinet 21 where this groove portion 55 is provided, along line C-C and line D-D at a location serving as the middle of line A-A and line E-E, and a location serving as the middle of line B-B and line E-E illustrated in A in FIG. 12.

As can be understood from B in FIG. 12 through D in FIG. 12, the groove portion 55 is provided so as to gradually deepen from the transverse side portion 21e to the center of the longitudinal side portion 21g of the side cabinet 21, and also provided so as to gradually shallow from the center of the longitudinal side portion 21g to the transverse side portion 21f.

In other words, the depth of the groove portion 55 shallows as the groove portion 55 comes closer to the transverse side portion 21e and transverse side portion 21f, and deepens as the groove portion 55 comes closer to the center of the longitudinal side portion 21g.

The groove portions 55 are configured to function as an adhesive agent holding unit for fixing the adhesive agent 24 applied to the side cabinet 21.

Specifically, the cross-sectional shape of the side cabinet 21 where the groove portion 55 is provided forms a staircase shape with a first parallel portion 21c and a second parallel portion 21d being provided to the inner circumference wall portion 21b as illustrated in FIG. 9 though there is some difference in the shape depending on locations as described above.

Therefore, in the event of having applied the adhesive agent 24 to this side cabinet 21 using the dispenser apparatus, the applied adhesive agent 24 can be held in a stable manner by the first parallel portion 21c and the second parallel portion 21d as illustrated in FIG. 9.

Also, in the event of having mounted the edge portion of the lens 12 of the display portion 2 to this side cabinet 21, the adhesive agent 24 flows into the groove portion 55. As described above, an adhesive agent whereby predetermined elasticity can be maintained even after hardening is employed as the adhesive agent 24.

Therefore, the cellular phone according to this fifth embodiment has an elastic member which is even thicker than that of the cellular phone according to the first embodiment at the transverse side portions 21e and 21f of the side cabinet 21 by an amount equivalent to that of the adhesive agent 24 flowing into the groove portion 55. The thickness of the elastic member according to this adhesive agent 24 thickens as the elastic member comes closer to the centers of the longitudinal side portions 21g and 21h of the side cabinet 21.

As is apparent from the above description, with the cellular phone according to the fifth embodiment, the groove portion 55 is provided along the inner circumference wall portion 21b of the longitudinal side portions 21g and 21h of the side cabinet 21. The depth of this groove portion 55 deepens as the groove portion comes closer to the centers of the longitudinal side portions 21g and 21h.

Thus, the cross-sectional shapes of the longitudinal side portions 21g and 21h of the side cabinet 21 can be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 55. Also, the thickness of the elastic member according to this adhesive agent 24 can be thickened as the elastic member comes closer to the centers of the longitudinal side portions 21g and 21h of the side cabinet 21. Therefore, shock absorbability can be improved as compared to the cellular phone according to the first embodiment, and also the same advantages can be obtained as with the cellular phone according to the first embodiment.

Note that, with this example, an arrangement has been made wherein though the depth of the groove portion 55 deepens as the groove portion 55 comes closer to the centers of the longitudinal side portions 21g and 21h of the side cabinet 21, an arrangement may be made wherein this groove portion 55 is provided to the transverse side portions 21e and 21f of the side cabinet 21, and the depth of the groove portion 55 deepens as the groove portion 55 comes closer to the centers of the transverse side portions 21e and 21f. Thus, in the same way as described above, this can improve shock absorbability as compared to the cellular phone according to the first embodiment, and also the same advantages can be obtained as with the cellular phone according to the first embodiment.

Sixth Embodiment

Next, a cellular phone serving as a sixth embodiment to which the present disclosure has been applied will be described.

The cellular phones according to the second through fifth embodiments have been examples wherein the groove portions 40, 45, 50 and 55 having depth along the width direction of the side cabinet 21 are provided, thereby realizing stable holding of the applied adhesive agent 24.

On the other hand, the cellular phone serving as the present sixth embodiment is an example wherein a groove portion having depth along the thickness direction of the side cabinet 21 is provided, thereby realizing stable holding of the applied adhesive agent 24.

Note that there is difference between the above second through fifth embodiments and the present sixth embodiment only in that the groove portion having depth along the thickness direction of the side cabinet 21 is provided. Therefore, hereafter, only description of this difference will be performed, and redundant description will be omitted.

Figure 13:
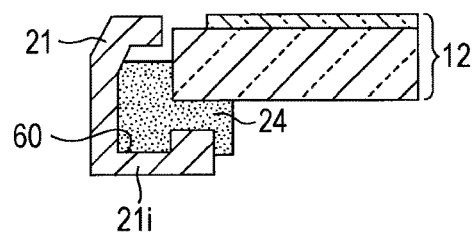
FIG. 13 is a cross-sectional view obtained by cutting away a side cabinet of a cellular phone according to a sixth embodiment of the present disclosure along the transverse direction of this cellular phone.

FIG. 13 illustrates a cross-sectional view obtained by cutting away the side cabinet 21 of the cellular phone according to the present sixth embodiment along the transverse direction of this cellular phone.

As can be understood from this FIG. 13, the cellular phone according to the present sixth embodiment includes a groove portion 60 having depth along the thickness direction of this side cabinet 21, provided along a bottom side portion 21i of the side cabinet 21 provided so as to surround the outer circumference of the display portion 2. This groove portion 60 is configured to function as an adhesive agent holding unit.

Note that this groove portion 60 may consecutively be provided to the side portions 21e, 21f, 21g, and 21h of the side cabinet 21, or may intermittently be provided with a certain interval. Also, this groove portion 60 may consecutively or intermittently be provided to only the transverse side portions 21e and 21f of the side cabinet 21, or may consecutively or intermittently be provided to only the longitudinal side portions 21g and 21h of the side cabinet 21. Also, this groove portion 60 may be provided so as to deepen as the groove portion 60 comes closer to the centers of the longitudinal side portions 21g and 21h (or transverse side portions 21e and 21f) of the side cabinet 21 as illustrated in A in FIG. 12 through D in FIG. 12.

In the event of having applied the adhesive agent 24 to such a side cabinet 21 using the dispenser apparatus, the applied adhesive agent 24 can be held in a stable manner by the groove portion 60 as illustrated in FIG. 13, as if adhesive fluid were put into a container.

Also, the adhesive agent 24 is held at the groove portion 60 having depth along the thickness direction of the side cabinet 21, and accordingly, a great amount of adhesive agent 24 can be held in a stable manner. Therefore, in the event that this held great amount of adhesive agent 24 has been hardened, a thick elastic member can be formed, and accordingly, further improvement in shock absorbability can be realized, and also the same advantages as with the above embodiments can be obtained.

Seventh Embodiment

Next, a cellular phone serving as a seventh embodiment to which the present disclosure has been applied will be described.

The cellular phones according to the second through fifth embodiments have been examples wherein the groove portions 40, 45, 50 and 55 having depth along the width direction of the side cabinet 21 are provided, thereby realizing stable holding of the applied adhesive agent 24.

On the other hand, the cellular phone serving as the present seventh embodiment is an example wherein a groove portion having depth that gradually deepens toward the corner portion 21a of this side cabinet 21 is provided to the bottom side portion 21i of the side cabinet 21, thereby realizing stable holding of the applied adhesive agent 24.

Note that there is difference between the above second through fifth embodiments and the present seventh embodiment only in that such a groove portion is provided. Therefore, hereafter, only description of this difference will be performed, and redundant description will be omitted.

Figure 14:
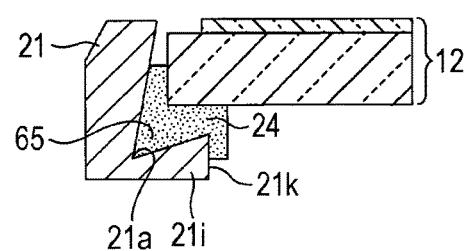
FIG. 14 is a cross-sectional view obtained by cutting away a side cabinet of a cellular phone according to a seventh embodiment of the present disclosure along the transverse direction of this cellular phone.

FIG. 14 illustrates a cross-sectional view obtained by cutting away the side cabinet 21 of the cellular phone according to the present seventh embodiment along the transverse direction of this cellular phone.

As can be understood from this FIG. 14, the cellular phone according to the present seventh embodiment includes a groove portion 65 having depth along the thickness direction of this side cabinet 21, formed by subjecting the bottom side portion 21i of the side cabinet 21 provided so as to surround the outer circumference of the display portion 2 to notch processing so as to be gradually inclined downward from a side wall portion 21k of this bottom side portion 21i to the corner portion 21a on the inner circumference side of the side cabinet 21. This groove portion 65 is configured to function as an adhesive agent holding unit.

Note that this groove portion 65 may consecutively be provided to the side portions 21e, 21f, 21g, and 21h of the side cabinet 21, or may intermittently be provided with a certain interval. Also, this groove portion 65 may consecutively or intermittently be provided to only the transverse side portions 21e and 21f of the side cabinet 21, or may consecutively or intermittently be provided to only the longitudinal side portions 21g and 21h of the side cabinet 21. Also, this groove portion 65 may be provided so as to deepen as the groove portion 65 comes closer to the centers of the longitudinal side portions 21g and 21h (or transverse side portions 21e and 21f) of the side cabinet 21 as illustrated in A in FIG. 12 through D in FIG. 12.

In the event of having applied the adhesive agent 24 to such a side cabinet 21 using the dispenser apparatus, the adhesive agent pools in the groove portion 65 inclined downward as illustrated in FIG. 14, and the applied adhesive agent 24 can be held in a stable manner by the groove portion 65.

Also, the adhesive agent 24 is held at the groove portion 65 having depth along the thickness direction of the side cabinet 21, and accordingly, a great amount of adhesive agent 24 can be held in a stable manner. Therefore, in the event that this held great amount of adhesive agent 24 has been hardened, a thick elastic member can be formed, and accordingly, further improvement in shock absorbability can be realized, and also the same advantages as with the above embodiments can be obtained.

Eighth Embodiment

Next, a cellular phone serving as an eighth embodiment to which the present disclosure has been applied will be described.

With the cellular phones according to the above embodiments, the inner circumference wall portion 21b of the side cabinet 21 has had a shape that linearly rises along the thickness direction of this side cabinet 21.

On the other hand, the cellular phone serving as the present eighth embodiment is an example wherein the inner circumference wall portion 21b of the side cabinet 21 has been subjected to inclination processing so as to have an angle in accordance with the bend angle of the nozzle 30 subjected to bend processing as described above.

Note that there is difference between the above embodiments and the present eighth embodiment only in that the inner circumference wall portion 21b of the side cabinet 21 has been subjected to inclination processing in this way. Therefore, hereafter, only description of this difference will be performed, and redundant description will be omitted.

Figure 15:
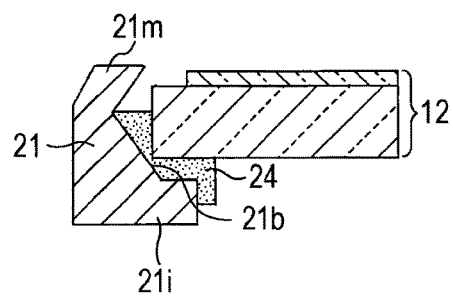
FIG. 15 is a cross-sectional view obtained by cutting away a side cabinet of a cellular phone according to an eighth embodiment of the present disclosure along the transverse direction of this cellular phone.

FIG. 15 illustrates a cross-sectional view obtained by cutting away the side cabinet 21 of the cellular phone according to the present eighth embodiment along the transverse direction of this cellular phone.

As can be understood from this FIG. 15, with the cellular phone according to the present eighth embodiment, the inner circumference wall portion 21b has been subjected to inclination processing so as to gradually incline from the upper side portion 21m to the bottom side portion 21i of the side cabinet 21 provided so as to surround the outer circumference of the display portion 2 to have the same inclination angle as the bend angle of the nozzle 30 subjected to bend processing.

Note that the inclination processing of such an inner circumference wall portion 21b may consecutively be provided to the side portions 21e, 21f, 21g, and 21h of the side cabinet 21, or may intermittently be provided with a certain interval. Also, the inclination processing of this inner circumference wall portion 21b may consecutively or intermittently be provided to only the transverse side portions 21e and 21f of the side cabinet 21, or may consecutively or intermittently be provided to only the longitudinal side portions 21g and 21h of the side cabinet 21.

In the event of having applied the adhesive agent 24 to such a side cabinet 21 using the dispenser apparatus, the bend angle of the nozzle 30 of this dispenser apparatus is the same angle as the inclination angle of the inner circumference wall portion 21b of the side cabinet 21, and accordingly, the adhesive agent 24 from the nozzle 30 is emitted generally perpendicularly to the inner circumference wall portion 21b of the side cabinet 21, and the adhesive agent 24 is applied to the inner circumference wall portion 21b of this side cabinet 21.

Thus, the adhesive agent 24 can more accurately be applied to the side cabinet 21, improvement in the yield of applied width can be realized, and also the same advantages as with the above embodiments can be obtained.

Ninth Embodiment

Next, a cellular phone serving as a ninth embodiment to which the present disclosure has been applied will be described.

The cellular phone according to the above eighth embodiment is an example wherein the inner circumference wall portion 21b of the side cabinet 21 has been subjected to inclination processing so as to have an angle in accordance with the bend angle of the nozzle 30 subjected to bend processing of the dispenser apparatus.

On the other hand, the cellular phone serving as the present ninth embodiment is an example wherein the inner circumference wall portion 21b of the side cabinet 21, and the edge portion of the lens 12 of the display portion 2 are each subjected to inclination processing so as to have an angle in accordance with the bend angle of the nozzle 30 subjected to bend processing of the dispenser apparatus.

Note that there is difference between the above eighth embodiment and the present ninth embodiment only in that the edge portion of the lens 12 of the display portion 2 has been subjected to inclination processing in this way. Therefore, hereafter, only description of this difference will be performed, and redundant description will be omitted.

Figure 16:
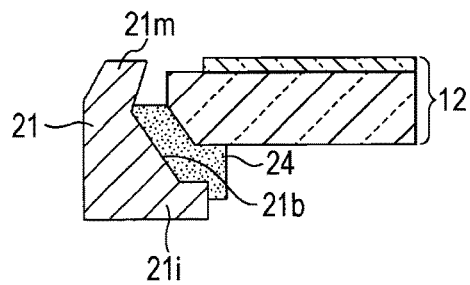
FIG. 16 is a cross-sectional view obtained by cutting away a side cabinet of a cellular phone according to a ninth embodiment of the present disclosure along the transverse direction of this cellular phone.

FIG. 16 illustrates a cross-sectional view obtained by cutting away the side cabinet 21 of the cellular phone according to the present ninth embodiment along the transverse direction of this cellular phone.

As can be understood from this FIG. 16, with the cellular phone according to the present ninth embodiment, the inner circumference wall portion 21b has been subjected to inclination processing so as to gradually incline from the upper side portion 21m to the bottom side portion 21i of the side cabinet 21 provided so as to surround the outer circumference of the display portion 2 to have the same inclination angle as the bend angle of the nozzle 30 subjected to bend processing.

Note that the inclination processing of such an inner circumference wall portion 21b may consecutively be provided to the side portions 21e, 21f, 21g, and 21h of the side cabinet 21, or may intermittently be provided with a certain interval. Also, the inclination processing of this inner circumference wall portion 21b may consecutively or intermittently be provided to only the transverse side portions 21e and 21f of the side cabinet 21, or may consecutively or intermittently be provided to only the longitudinal side portions 21g and 21h of the side cabinet 21.

Also, as can be understood from this FIG. 16, with the cellular phone according to the present ninth embodiment, the edge portion of the lens 12 of the display portion 2 has been subjected to inclination processing so as to have the same inclination angle as with the inner circumference wall portion 21b of the side cabinet 21.

In other words, with the cellular phone according to the present ninth embodiment, the edge portion of the lens 12 of the display portion 2 has been subjected to inclination processing so as to have the same inclination angle as the bend angle of the nozzle 30 subjected to bend processing of the dispenser apparatus.

In the event of having applied the adhesive agent 24 to such a side cabinet 21 using the dispenser apparatus, the bend angle of the nozzle 30 of this dispenser apparatus is the same angle as the inclination angle of the inner circumference wall portion 21b of the side cabinet 21, and accordingly, the adhesive agent 24 from the nozzle 30 is emitted generally perpendicularly to the inner circumference wall portion 21b of the side cabinet 21, and the adhesive agent 24 is applied to the inner circumference wall portion 21b of this side cabinet 21.

Similarly, in the event of having applied the adhesive agent 24 to the edge portion of the lens 12 of the display portion 2, the bend angle of the nozzle 30 of this dispenser apparatus is the same angle as the inclination angle of the edge portion of the lens 12, and accordingly, the adhesive agent 24 from the nozzle 30 is emitted generally perpendicularly to the edge portion of the lens 12, and the adhesive agent 24 is applied to the edge portion of this lens 12.

Thus, the adhesive agent 24 can more accurately be applied to the side cabinet 21, and the edge portion of the lens 12, and also improvement in the yield of applied width can be realized.

Also, as illustrated in FIG. 16, the amount of the adhesive agent between the inner circumference wall portion 21b of the side cabinet 21, and the edge portion of the lens 12 can be increased, improvement in shock absorbability can be realized, and also the same advantages as with the above embodiments can be obtained.

Tenth Embodiment

Next, a cellular phone serving as a tenth embodiment to which the present disclosure has been applied will be described.

Figure 17:
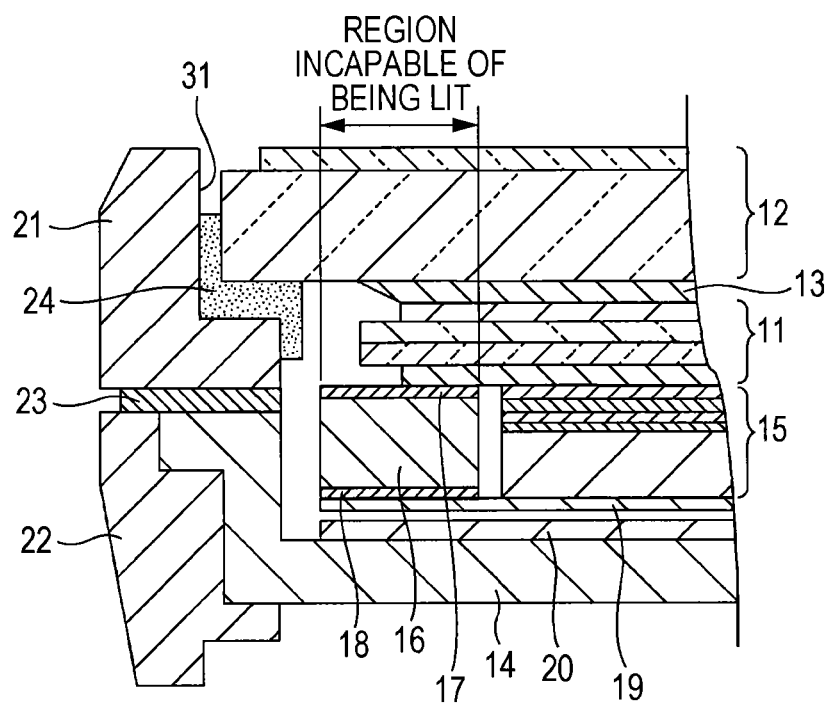
FIG. 17 is a diagram for describing a problem wherein narrow framing is restricted by a backlight frame.

With the cellular phones according to the above embodiments, as can be understood from FIG. 17, the backlight frame 16 for protecting the backlight unit 15 is provided in a manner overlapped with the display unit 11.

Figure 18:
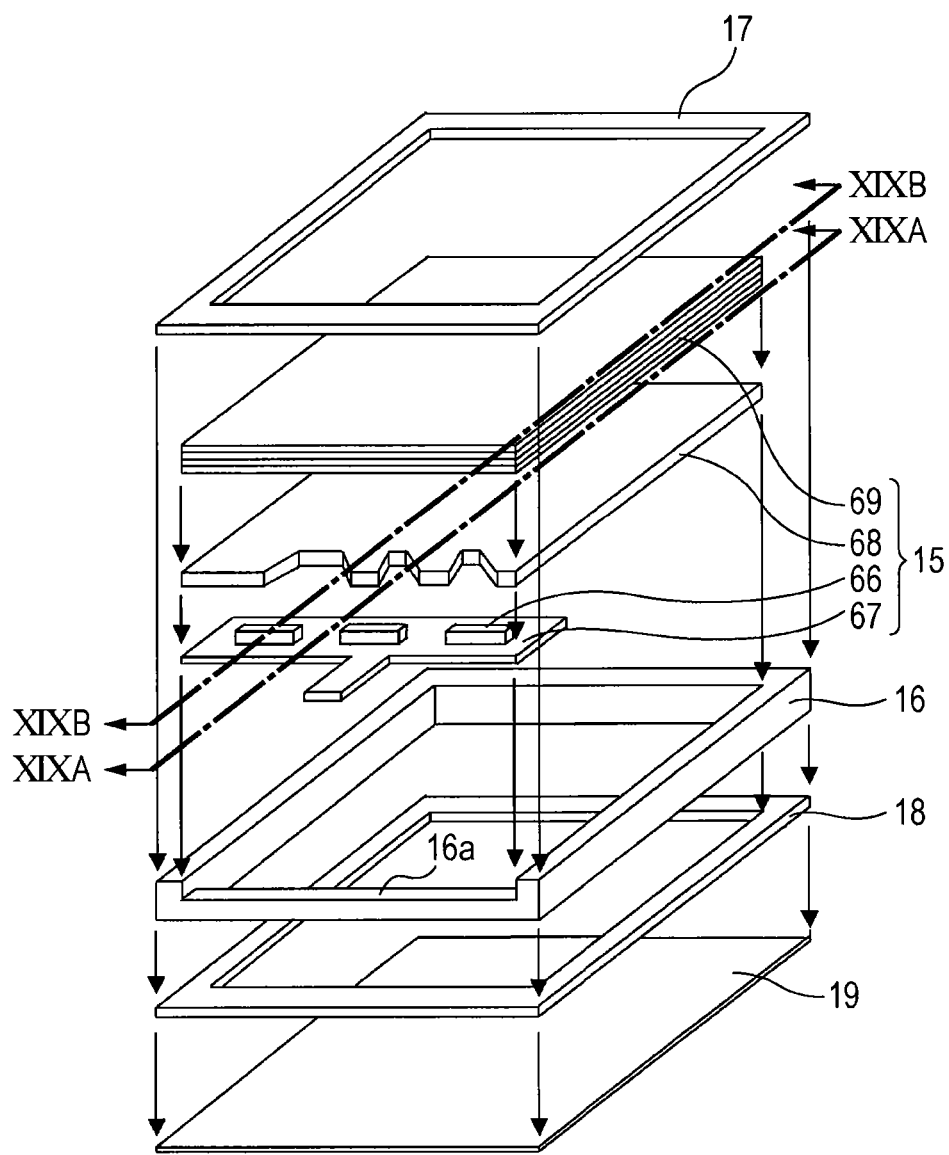
FIG. 18 is an exploded perspective view of a backlight unit and a backlight frame.

FIG. 18 is an exploded perspective view of the backlight unit 15 and backlight frame 16. As illustrated in this FIG. 18, the backlight frame 16 has a rectangular frame shape, and is glued to the reflector 19 via the tape 18 glued to the bottom portion.

Also, a notch portion 16a for drawing a flexible substrate 67 of the backlight unit 15 is provided to one transverse side portion of this backlight frame 16.

The backlight unit 15 includes the flexible substrate 67 where multiple light emitting diodes 66 (LED) are provided, a light guide 68 for guiding the light emitted from the light emitting diodes 66 into a predetermined location, and an optical plate 69 formed of multiple prism plates, a diffusion plate, and so forth.

Figure 19A:
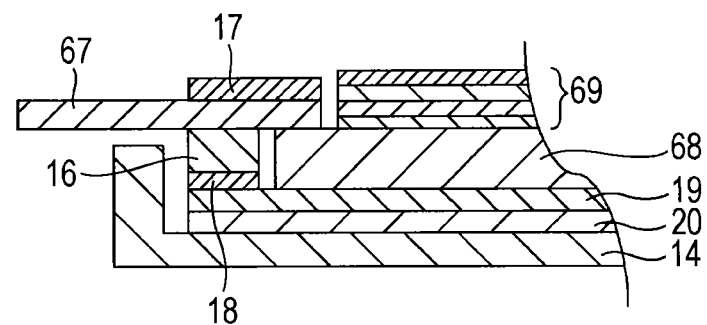
FIGS. 19A-19B are cross-sectional views of the backlight unit and backlight frame.
Figure 19B:
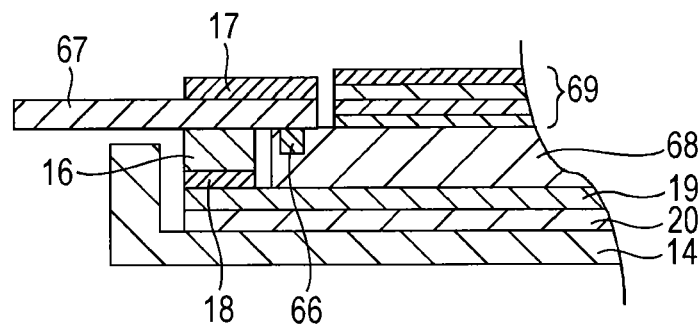

A in FIG. 19 is a cross-sectional view obtained by cutting away the backlight unit 15 and backlight frame 16 and so forth along line A-A at a location where no light emitting diode 66 illustrated in FIG. 18 exists, and B in FIG. 19 is a cross-sectional view obtained by cutting away the backlight unit 15 and backlight frame 16 and so forth along line B-B at a location where a light emitting diode 66 illustrated in FIG. 18 exist.

As can be understood from A in FIG. 19 and B in FIG. 19, the backlight frame 16 performs storage of the backlight unit 15 in a state in which the flexible substrate 67 has been drawn from the notch portion 16a.

The backlight frame 16 of which the upper face portion is glued with the tape 17 is glued to the display unit 11 illustrated in FIG. 17 via this tape 17.

Here, as illustrated in FIG. 17, the backlight frame 16 for protecting the backlight unit 15 is provided in a manner overlapped with the display unit 11.

Therefore, it is difficult to irradiate the light from the backlight unit 15 to a portion where this backlight frame 16 and display unit 11 are overlapped. The portion where it is difficult to irradiate the light from the backlight unit 15 causes an inconvenience in that a portion which cannot be used as a display region is formed on the display unit 11.

Also, though narrowing the width of the backlight frame 16 enables further narrow framing to be realized, this backlight frame 16 is configured so that the upper and lower sides are glued and fixed with the tape 17 and tape 18 as illustrated in FIG. 17 and so forth.

It has been difficult to manufacture a tape of which the width is equal to or smaller than 0.8 mm as the tape 17 and tape 18. Therefore, the width of the backlight frame 16 is also restricted to 0.8-mm width in accordance with the manufacturing restriction of the tapes, and significant narrow framing of a cellular phone is not realized.

Tenth embodiment through Nth embodiment that will be described below are cellular phones wherein significant narrow framing and also effective use of the entire region of the display portion are realized by omitting the backlight frame 16.

[Configuration of Tenth Embodiment]

Figure 20:
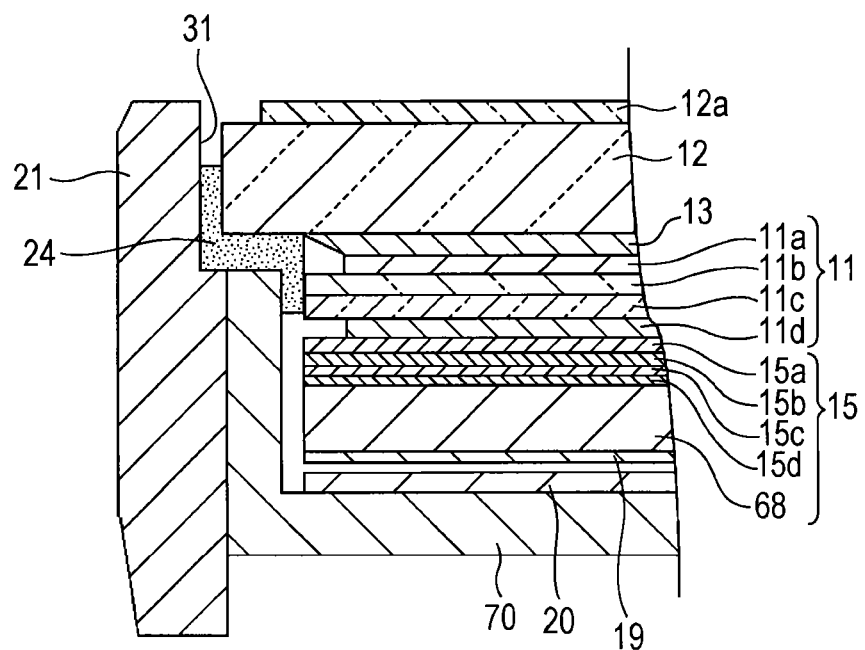
FIG. 20 is a cross-sectional view of rear cabinet assembly of a cellular phone serving as a tenth embodiment of the present disclosure.

First, a cross-sectional view of the principal portions of a cellular phone serving as a tenth embodiment of the present disclosure is illustrated in FIG. 20.

As illustrated in FIG. 20, with the cellular phone serving as the present tenth embodiment, the backlight frame 16 which the backlight unit 15 is housed is omitted, and a rear frame 70 handles the function of this backlight frame 16.

Figure 21:
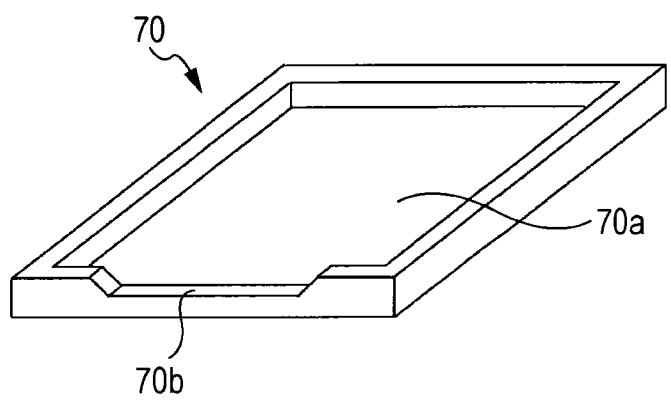
FIG. 21 is a perspective view of a rear frame of the cellular phone serving as the tenth embodiment.

A perspective view of this rear frame 70 is illustrated in FIG. 21. As illustrated in this FIG. 21, the rear frame 70 has a rectangular box shape including a bottom portion 70a, and has height whereby at least the backlight unit 15 can be housed.

Also, with this rear frame 70, a notch portion 70b for drawing the flexible substrate 67 of the backlight unit 15 is provided to one transverse side portion.

Figure 22A:
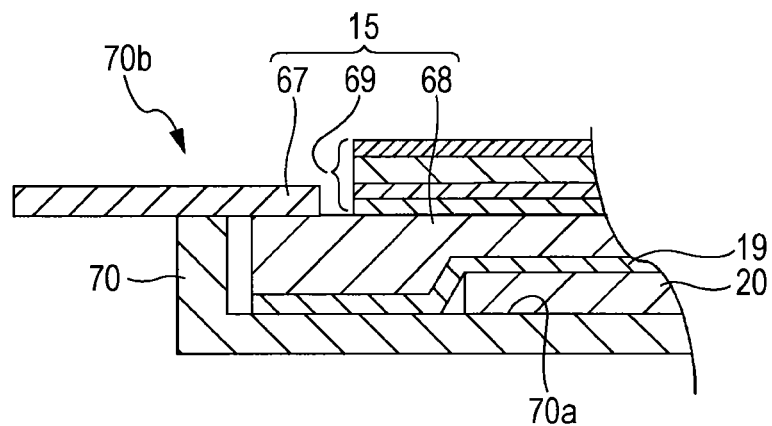
FIGS. 22A-22B are cross-sectional views of a principal portion of the cellular phone serving as the tenth embodiment.
Figure 22B:
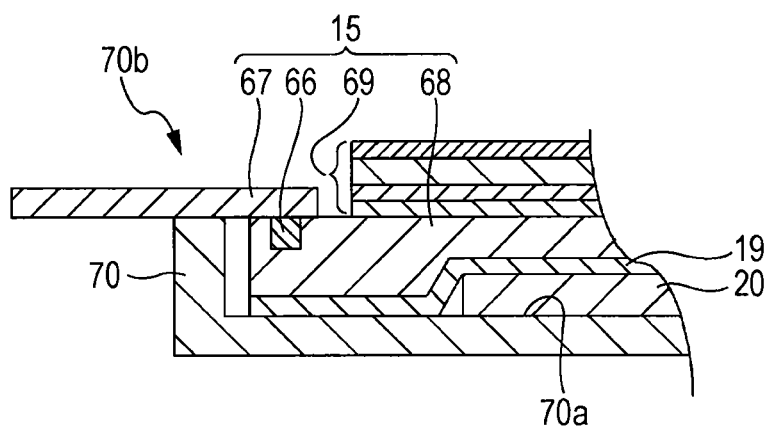
Figure 23A:
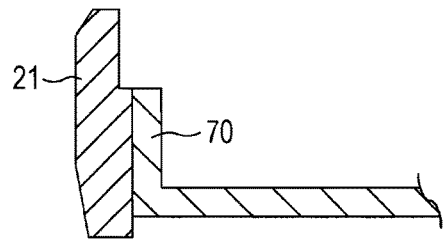
FIGS. 23A-23F are diagrams illustrating an assembly process of rear cabinet assembly of the cellular phone serving as the tenth embodiment.
Figure 23B:
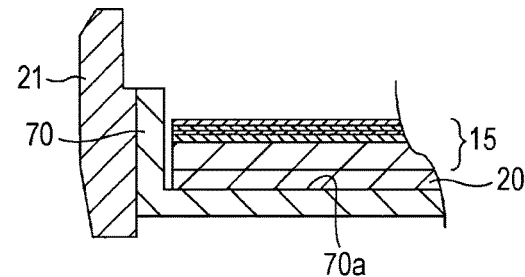
Figure 23C:
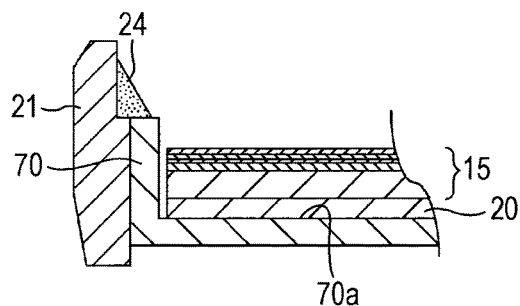
Figure 23D:
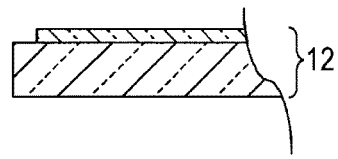
Figure 23E:
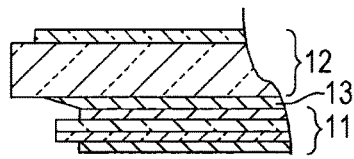
Figure 23F:
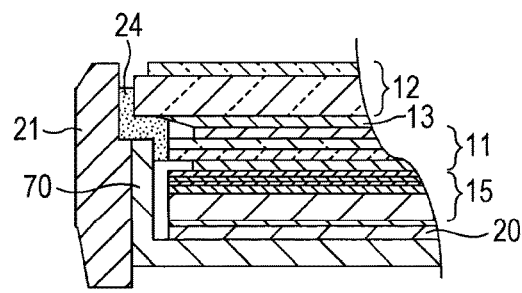

A in FIG. 22 is a cross-sectional view obtained by cutting away the rear frame 70, and the backlight unit 15 and so forth housed in the rear frame 70 along the longitudinal direction at a location where no light emitting diode 66 illustrated in FIG. 18 exists, and B in FIG. 22 is a cross-sectional view obtained by cutting away the rear frame 70, and the backlight unit 15 and so forth housed in the rear frame 70 along the longitudinal direction at a location where a light emitting diode 66 illustrated in FIG. 18 exists.

As can be understood from A in FIG. 22 and B in FIG. 22, the flexible substrate 67 of the backlight unit 15 is drawn from the notch portion 70b, and the cushion sheet 20, reflector 19, light guide 68, and optical plate 69 are sequentially laminated on the rear frame 70, and housing of the backlight unit 15 is performed.

[Assembly Process of Rear Cabinet Assembly]

An assembly process of a rear cabinet assembly of the cellular phone according to the present tenth embodiment is illustrated in A in FIG. 23 through F in FIG. 23.

First, in the case of the cellular phone according to the present tenth embodiment, the side cabinet 21 and rear frame 70 are integrally molded by outsert molding. In the event of assembling the rear cabinet assembly, the cushion sheet 20 and backlight unit 15 are housed in the bottom portion 70a of the rear frame 70 subjected to outsert molding with the side cabinet 21 as illustrated in A in FIG. 23 and B in FIG. 23.

Next, as illustrated in C in FIG. 23, the adhesive agent 24 is applied to a portion where the edge portion of the lens 12 of the display portion 2 is mounted, using the nozzle 30 subjected to bend processing of the dispenser apparatus.

Next, as illustrated in D in FIG. 23 and E in FIG. 23, the lens 12 of the display portion 2, and the display unit 11 are glued via the lamination member 13. As illustrated in F in FIG. 23, the edge portion of the lens 12 is mounted to a location where the adhesive agent 24 of the side cabinet 21 and rear frame 70 has been applied, and also the display unit 11 is mounted onto the backlight unit 15, and fixed by a tool until the adhesive agent 24 is hardened, and assembly of the rear cabinet assembly is completed.

[Advantages of Tenth Embodiment]

The cellular phone according to the present tenth embodiment includes the rear frame 70 having a function for housing and protecting the backlight unit 15 as illustrated in FIG. 20 and so forth. Therefore, as illustrated in FIG. 20 and so forth, the backlight frame 16 can be omitted, and significant narrow framing of this cellular phone can be realized by an amount equivalent to this omitted backlight frame 16.

Also, the backlight frame 16 can be omitted, whereby the light from the backlight unit 15 can be irradiated on generally the entirety of the display region of the display portion, and the entire display region of this display portion can effectively be used.

Also, as described above, the side cabinet 21 is reduced in size by being formed of a metal member, whereby further narrow framing of this cellular phone can be realized, and also the same advantages of the above embodiments can be obtained.

Eleventh Embodiment

Next, a cellular phone serving as an eleventh embodiment to which the present disclosure has been applied will be described.

The cellular phone according to the above tenth embodiment has been an example wherein the backlight unit 15 is stored in the rear frame 70 having a rectangular box shape as illustrated in FIG. 21 without change.

On the other hand, the cellular phone according to the present eleventh embodiment is an example wherein a hole portion is provided to the rear frame, and this hole portion is configured so that a portion of the backlight unit 15 can be inserted thereinto, whereby the thick light guide 68 can be used, and the light from the light emitting diodes 66 can be guided in a stable manner.

Note that only this point differs between the above tenth embodiment and the present eleventh embodiment. Therefore, hereafter, only description of this difference will be performed, and redundant description will be omitted.

First, in the case of the above tenth embodiment, the backlight unit 15 is housed in the rear frame 70 having a rectangular box shape without change, and accordingly, the entire thickness at the time of housing the backlight unit 15 in the rear frame 70 as illustrated in FIG. 22 is thickness obtained by adding the thickness of the bottom portion 70a of the rear frame 70, and the thickness of the backlight unit 15.

Therefore, in the event of having used the thick light guide 68 for realizing stability of light guiding, the entire thickness at the time of housing the backlight unit 15 in the rear frame 70 may be thickened.

Figure 24:
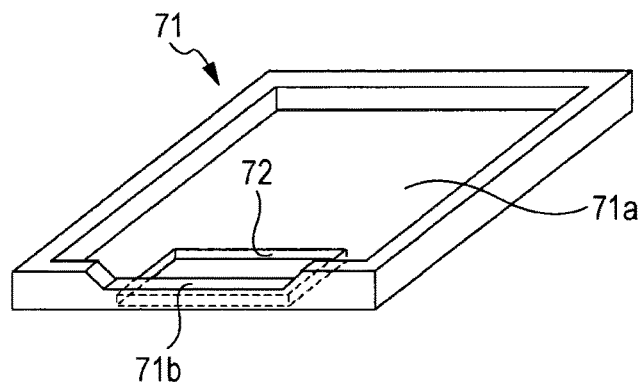
FIG. 24 is a perspective view of a rear frame of a cellular phone serving as an eleventh embodiment of the present disclosure.

The cellular phone according to the present eleventh embodiment includes a rear frame 71 illustrated in FIG. 24. This rear frame 71 has a rectangular box shape having a bottom portion 71a, and has height whereby at least the backlight unit 15 can be housed.

Also, with this rear frame 71, a notch portion 71b for drawing the flexible substrate 67 of the backlight unit 15 is provided to one transverse side portion.

Also, with this rear frame 71, the longitudinal side portion thereof has a generally rectangular hole portion 72 along the transverse direction of the rear frame 71 at a location approximate to the notch portion 71b of the bottom portion 71a.

Figure 25A:
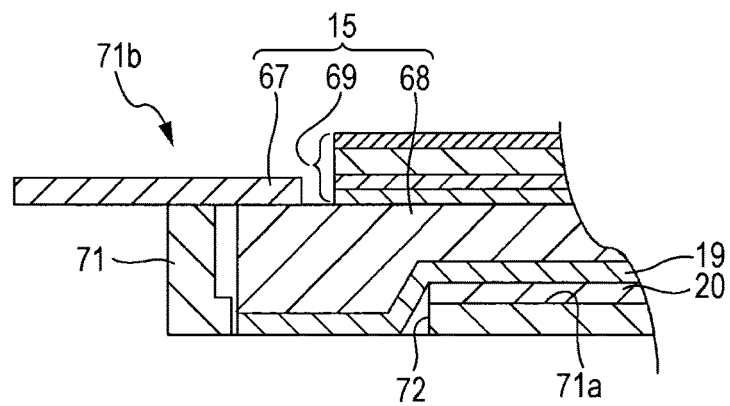
FIGS. 25A and 25B are cross-sectional views of a principal portion of the cellular phone serving as the eleventh embodiment.
Figure 25B:
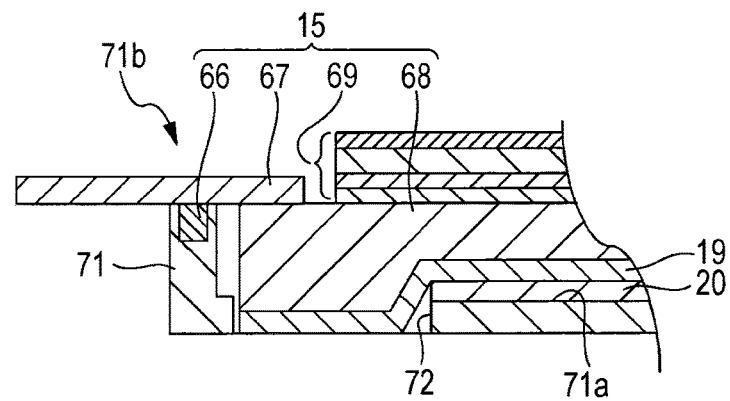
Figure 26A:
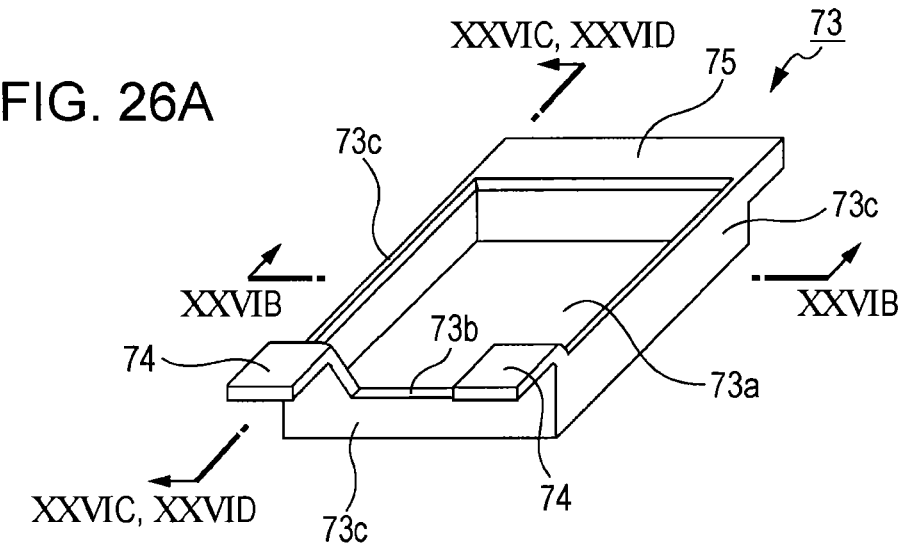
FIGS. 26A-26D are diagrams for describing a rear frame of a cellular phone serving as a twelfth embodiment of the present disclosure.
Figure 26B:
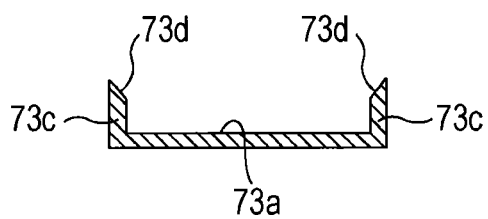
Figure 26C:
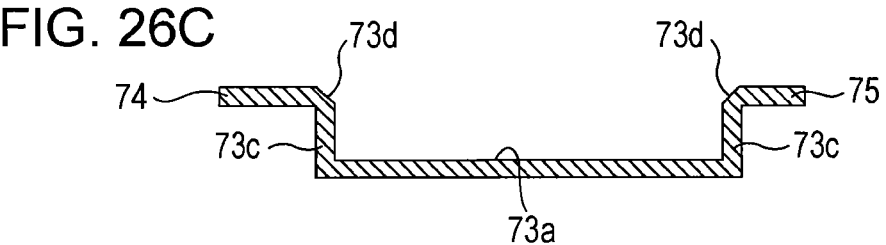
Figure 26D:
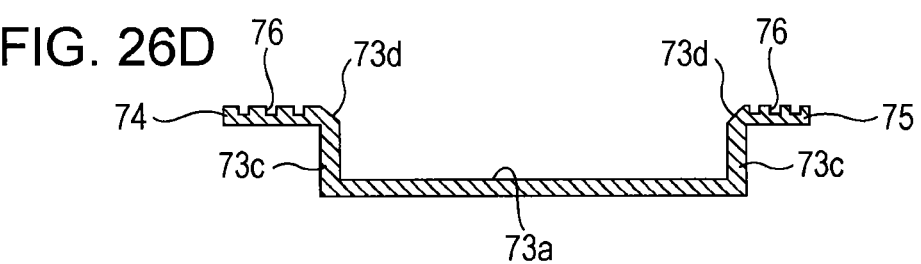

A in FIG. 25 is a cross-sectional view obtained by housing the backlight unit 15 in such a rear frame 71, and cutting away the rear frame 71, and the backlight unit 15 and so forth housed in this rear frame 71 along the longitudinal direction at a location where no light emitting diode 66 illustrated in FIG. 18 exists.

Also, B in FIG. 25 is a cross-sectional view obtained by housing the backlight unit 15 in such a rear frame 71, and cutting away the rear frame 71, and the backlight unit 15 and so forth housed in this rear frame 71 along the longitudinal direction at a location where a light emitting diode 66 illustrated in FIG. 18 exists.

As can be understood from A in FIG. 25 and B in FIG. 25, the reflector 19 and light guide 68 on the flexible substrate 67 side of the backlight unit 15 are first dropped into the hole portion 72, and the backlight unit 15 is housed in the rear frame 71.

Thus, the thickness of the portion corresponding to the hole portion 72 of the backlight 15 can have thickness obtained by subtracting the thickness of the reflector 19 from the thickness of the bottom portion 71a of the rear frame 71.

Thus, the light from the light emitting diodes 66 can be guided in a stable manner by the thick light guide 68, and also, the same advantages as with the cellular phone according to the above tenth embodiment can be obtained.

Twelfth Embodiment

Next, a cellular phone serving as a twelfth embodiment to which the present disclosure has been applied will be described.

The cellular phone according to the present twelfth embodiment is an example wherein the adhesive agent 24 can be applied to the rear frame in an even and stable manner using the nozzle 30 subjected to bend processing.

Note that only this point differs between the above embodiments and the present twelfth embodiment. Therefore, hereafter, only description of this difference will be performed, and redundant description will be omitted.

The cellular phone according to the present twelfth embodiment has the rear frame 73 illustrated in A in FIG. 26. This rear frame 73 has a rectangular box shape having a bottom portion 73a, and has height whereby at least the back light unit 15 can be housed.

Also, with this rear frame 73, a notch portion 73b for drawing the flexible substrate 67 of the backlight unit 15 is provided to one transverse side portion.

Also, with this rear frame 73, a pair of attachment side portions 74 are provided to the one transverse side portion sandwiching the notch portion 73b therebetween so as to protrude from the one transverse side portion along the longitudinal direction of this rear frame 73.

Also, with this rear frame 73, an attachment side portion 75 having a generally rectangular long plate shape is provided to the other transverse side portion so as to protrude from the other transverse side portion along the longitudinal direction of this rear frame 73.

B in FIG. 26 is a cross-sectional view of a state in which the rear frame 73 has been cut along line A-A illustrated in A in FIG. 26, and C in FIG. 26 is a cross-sectional view of a state in which the rear frame 73 has been cut along line B-B illustrated in A in FIG. 26.

As illustrated in B in FIG. 26 and C in FIG. 26, an edge portion 73d on the open side of wall portions 73c of the rear frame 73 has been subjected to notch processing so that the height gradually lowers form the outer side to the inner side of the wall portions 73c. The inclination angle of this notch processing is the same angle as the bend angle of the nozzle 30 of the dispenser apparatus.

Thus, in the case of the cellular phone according to the present twelfth embodiment, the adhesive agent 24 can be applied to the rear frame 73 in an even and stable manner using the nozzle 30 subjected to bend processing, and also the same advantages as with the cellular phones according to the above embodiments can be obtained.

Note that D in FIG. 26 illustrates a cross-sectional view of a state in which the rear frame 73 has been cut serving as a modification along line B-B illustrated in A in FIG. 26. A groove portion 76 may be provided to the attachment side portions 74 and 75 as illustrated in D in FIG. 26. Thus, the fixability of the adhesive agent 24 applied to the attachment side portions 74 and 75 can be improved.

Thirteenth Embodiment

Next, a cellular phone serving as a thirteenth embodiment to which the present disclosure has been applied will be described.

The cellular phone according to the above twelfth embodiment has been an example wherein the entire edge portion 73d on the open side of the wall portions 73c of the rear frame 73 have been subjected to the notch processing. On the other hand, the cellular phone according to the present thirteenth embodiment is an example wherein a portion of the edge portion 73d on the open side of the wall portions 73c of the rear frame 73 have been subjected to the notch processing.

Note that only this point differs between the above twelfth embodiment and the present thirteenth embodiment. Therefore, hereafter, only description of this difference will be performed, and redundant description will be omitted.

Figure 27A:
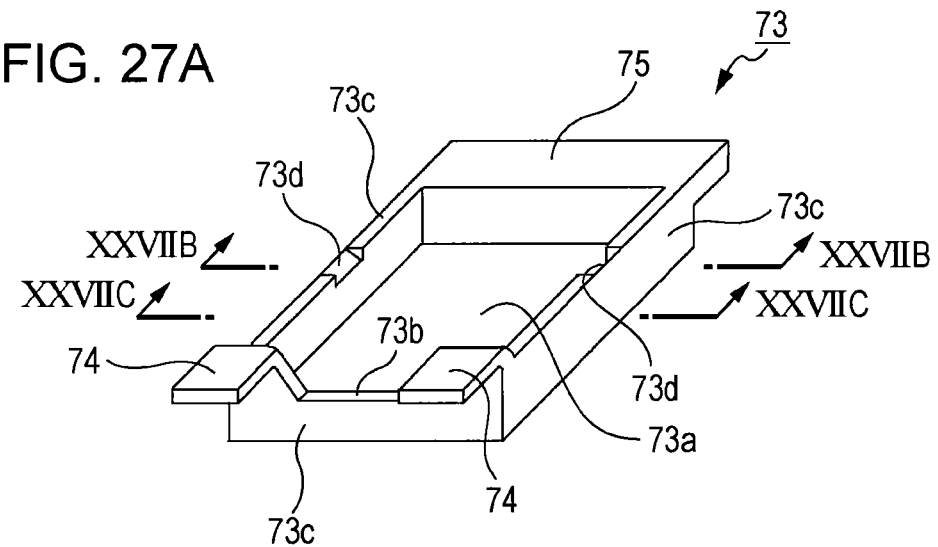
FIGS. 27A-27C are diagrams for describing a rear frame of a cellular phone serving as a thirteenth embodiment of the present disclosure.
Figure 27B:
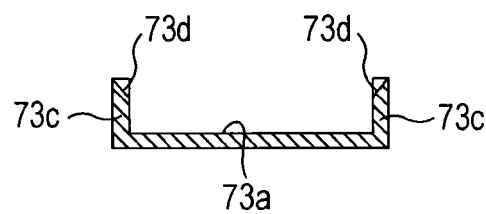
Figure 27C:
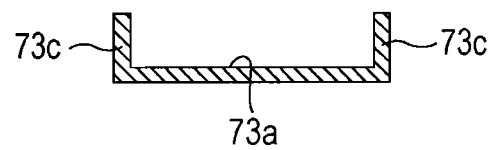

In the case of the cellular phone according to the present thirteenth embodiment, as illustrated in A in FIG. 27, of the edge portion 73d on the open side of the wall portions 73c of the longitudinal side portions of the rear frame 73, only predetermined mutually facing locations have been subjected to notch processing.

B in FIG. 27 is a cross-sectional view of the rear frame 73 in a state in which the portion subjected to notch processing illustrated in A in FIG. 27 has been cut along line A-A, and C in FIG. 27 is a cross-sectional view in a state in which a portion not subjected to notch processing illustrated in A in FIG. 27 has been cut along line B-B.

As illustrated in B in FIG. 27 and C in FIG. 27, of the edge portion 73d on the open side of the wall portions 73c of the rear frame 73, a portion has been subjected to notch processing so that the height is gradually lowered from the outer side to the inner side of the wall portions 73c. The inclination angle of this notch processing is the same angle as the bend angle of the nozzle 30 of the dispenser apparatus.

Thus, in the case of the cellular phone according to the present thirteenth embodiment as well, the adhesive agent 24 can be applied to the rear frame 73 in an even and stable manner using the nozzle 30 subjected to bend processing, and also the same advantages as with the cellular phone according to the above twelfth embodiment can be obtained.

Fourteenth Embodiment

Next, a cellular phone serving as a fourteenth embodiment to which the present disclosure has been applied will be described.

The cellular phone according to the above twelfth embodiment or thirteenth embodiment has been an example wherein the entirety or a portion of the edge portion 73d on the open side of the wall portions 73c of the rear frame 73 has been subjected to the notch processing. On the other hand, the cellular phone according to the present fourteenth embodiment is an example wherein a protruding portion has been provided to a portion of the edge portion 73d on the open side of the wall portions 73c in the longitudinal direction of the rear frame 73.

Note that only this point differs between the above twelfth and thirteenth embodiments and the present fourteenth embodiment. Therefore, hereafter, only description of this difference will be performed, and redundant description will be omitted.

Figure 28A:
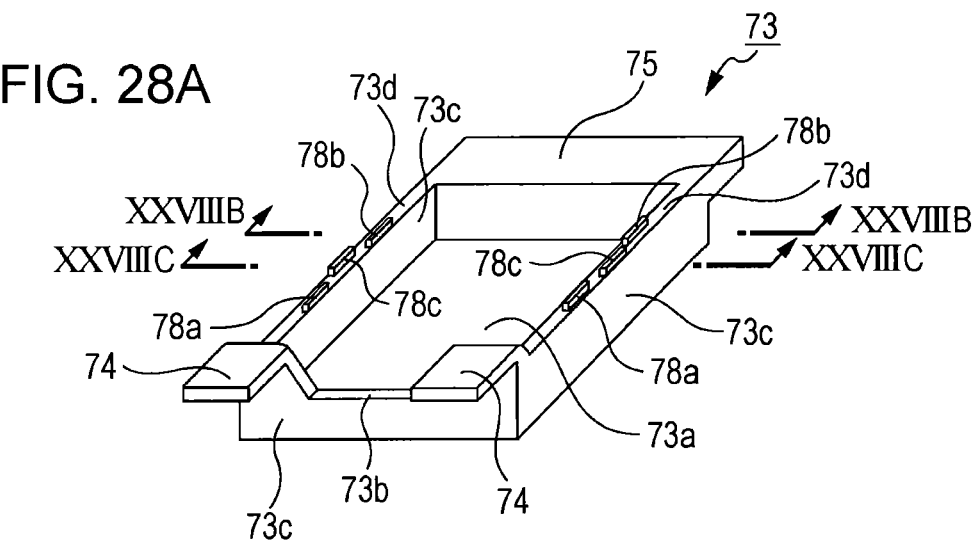
FIGS. 28A-28C are diagrams for describing a rear frame of a cellular phone serving as a fourteenth embodiment of the present disclosure.
Figure 28B:
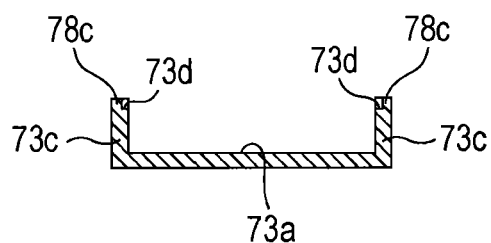
Figure 28C:
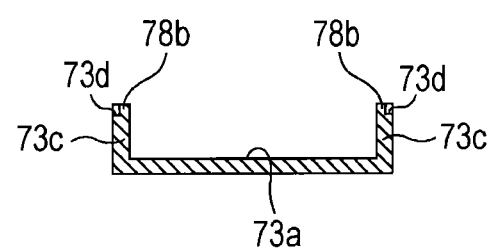

In the case of the cellular phone according to the present fourteenth embodiment, as illustrated in A in FIG. 28, of the edge portion 73d on the open side of the wall portions 73c of the longitudinal side portions of the rear frame 73, three protruding portions 78a through 78c of which the cross sections have a generally square bar shape are provided to each of predetermined mutually facing locations.

The protruding portion 78a and protruding portion 78b are provided along the inner wall side of the edge portion 73d on the open side of the wall portions 73c with a certain interval so as to protrude on the opposite side of the wall portions 73c of the longitudinal side portions. Also, the protruding portion 73c is provided so as to locate between the protruding portion 78a and the protruding portion 78b provided with a certain interval, and also on the outer wall side of the edge portion 73d on the open side of the wall portions 73c, and so as to protrude on the opposite side of the wall portions 73c of the longitudinal side portions.

B in FIG. 28 is a cross-sectional view of the rear frame 73 in a state in which the location where the protruding portion 78c illustrated in A in FIG. 28 has been cut along line A-A, and C in FIG. 28 is a cross-sectional view of the rear frame 73 in a state in which the location where the protruding portion 78c illustrated in A in FIG. 28 has been cut along line B-B.

As can be understood from B in FIG. 28 and C in FIG. 28, at this rear frame 73 the adhesive agent 24 applied by the dispenser apparatus flows between the protruding portions 78a and 78b and is fixed.

In other words, in the case of this rear frame 73, the protruding portions 78a through 78b are alternately provided on the outer wall side and inner wall side of the edge portion 73d on the open side of the wall portions 73c, and accordingly, a groove portion of an amount equivalent to the height of the protruding portions 78a through 78b is formed. The adhesive agent 24 applied by the dispenser apparatus flows into this groove portion and is fixed.

Thus, with the cellular phone according to the present fourteenth embodiment, the adhesive agent 24 applied to the rear frame 73 can be stabilized, and also the same advantages as with the cellular phones according to the above embodiments can be obtained.

[Modifications of Tenth Embodiment Through Fourteenth Embodiment]

With description in the above tenth embodiment through the fourteenth embodiment, though the side cabinet 21 and rear frame 70 have integrally been molded by outsert molding, the side cabinet 21 and rear frame 70 may be glued by a tape.

Figure 29A:
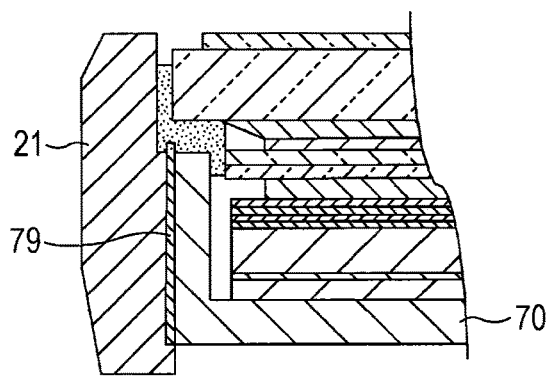
FIGS. 29A-29C are diagrams for describing a modification of the cellular phones serving as the tenth through fourteenth embodiments of the present disclosure.
Figure 29B:
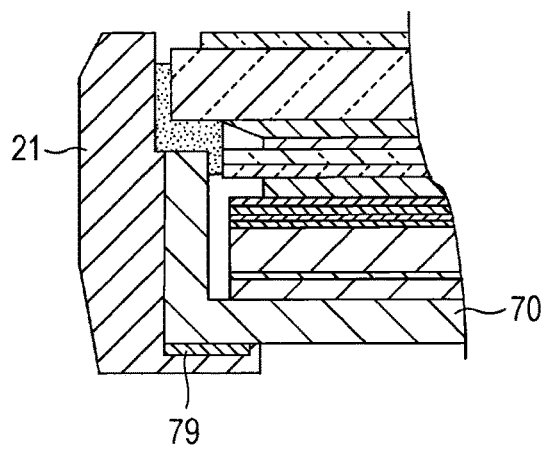
Figure 29C:
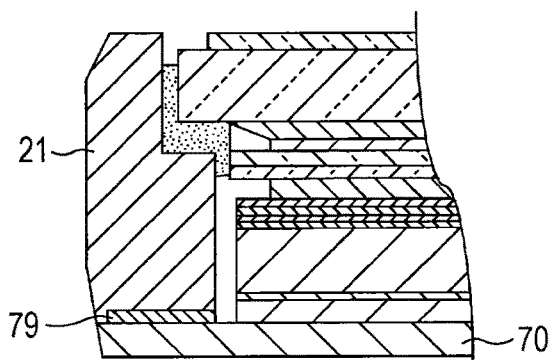

A in FIG. 29 is an example wherein the outer wall portion side of the rear frame 70, and the side cabinet 21 have been glued by a tape 79.

B in FIG. 29 is an example wherein a portion of the bottom portion of the side cabinet 21 forms this side cabinet 21 so as to overlap with the rear frame 70, this side cabinet 21 and rear frame 70 are glued by the tape 79 glued to this overlapped portion.

Even in either example case of the example illustrated in A in FIG. 29 and the example illustrated in B in FIG. 29, the rear frame 70 functions so as to protect the backlight unit 15. Thus, the same advantages as with the cellular phones according to the above embodiments can be obtained, such that narrow framing can be realized by omitting the backlight frame 16, or the like.

Also, C in FIG. 29 is an example wherein the rear frame 70 is formed so that a portion of the rear frame 70 is overlapped with the side cabinet 21, this side cabinet 21 and rear frame 70 are glued by the tape 79 glued to this overlapped portion.

In the case of the cellular phone in the example illustrated in C in FIG. 29, the side cabinet 21 functions so as to protect the backlight unit 15. Thus, the same advantages as with the cellular phones according to the above embodiments can be obtained, such that narrow framing can be realized by omitting the backlight frame 16, or the like.

Fifteenth Embodiment

Next, a cellular phone serving as a fifteenth embodiment to which the present disclosure has been applied will be described.

With description in the above tenth embodiment through the fourteenth embodiment, the side cabinet 21 and rear frame 70 have integrally been molded by outsert molding. Also, with description in the modification of the tenth embodiment through the fourteenth embodiment, the side cabinet 21 and rear frame 70 have been glued by the tape.

On the other hand, the cellular phone according to the present fifteenth embodiment is an example wherein the side cabinet 21 and rear frame 70 have integrally been cast by a metal member, for example, such as aluminum, titan (titanium), or the like.

Note that only this point differs between the above embodiments and modification, and the present fifteenth embodiment. Therefore, hereafter, only description of this difference will be performed, and redundant description will be omitted.

Figure 30:
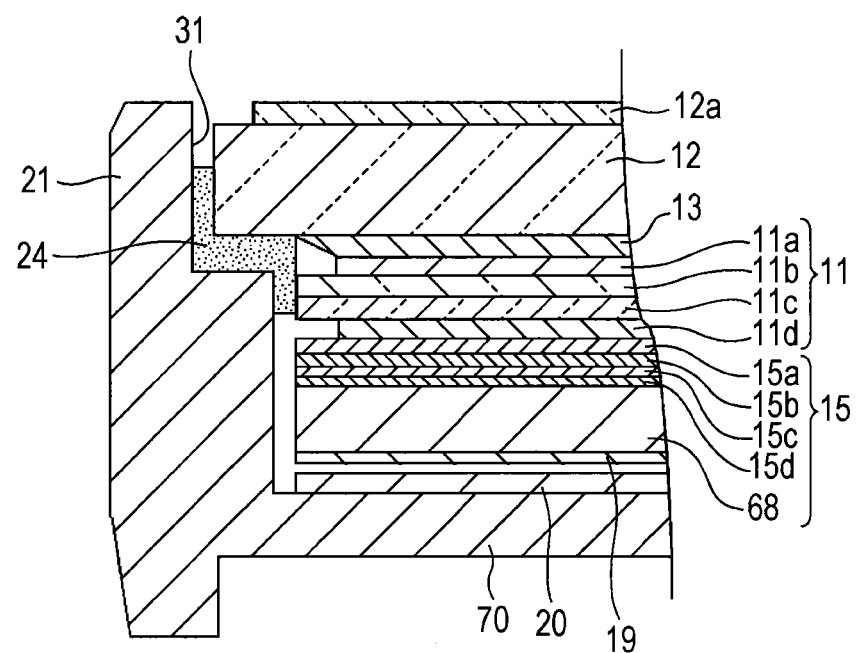
FIG. 30 is a cross-sectional view of rear cabinet assembly of a cellular phone serving as a fifteenth embodiment of the present disclosure.
Figure 31A:
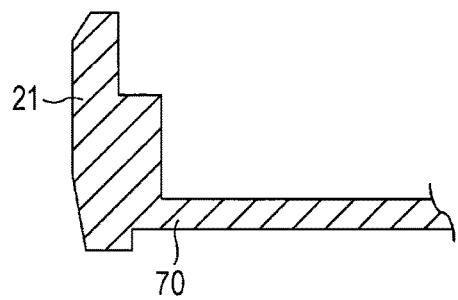
FIGS. 31A-31F are diagrams illustrating an assembly process of the rear cabinet assembly of the cellular phone serving as the fifteenth embodiment.
Figure 31B:
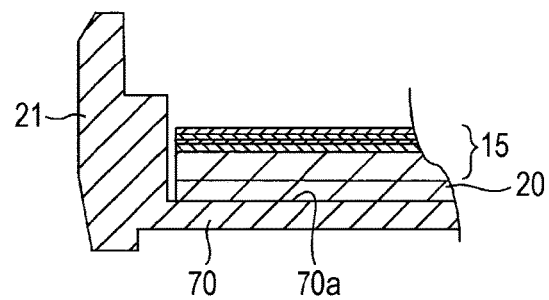
Figure 31C:
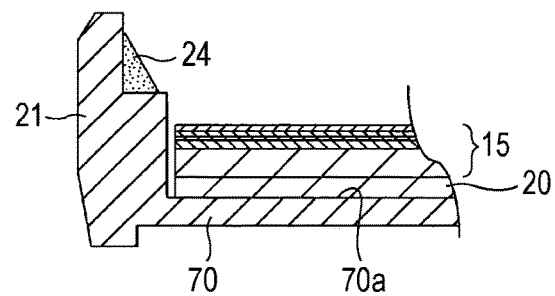
Figure 31D:
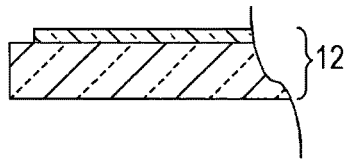
Figure 31E:
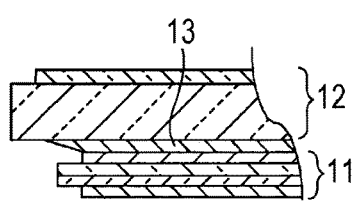
Figure 31F:
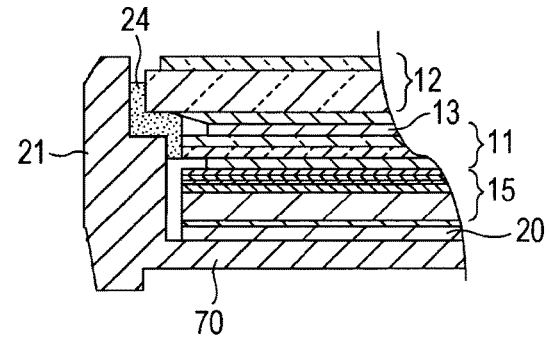
Figure 32:
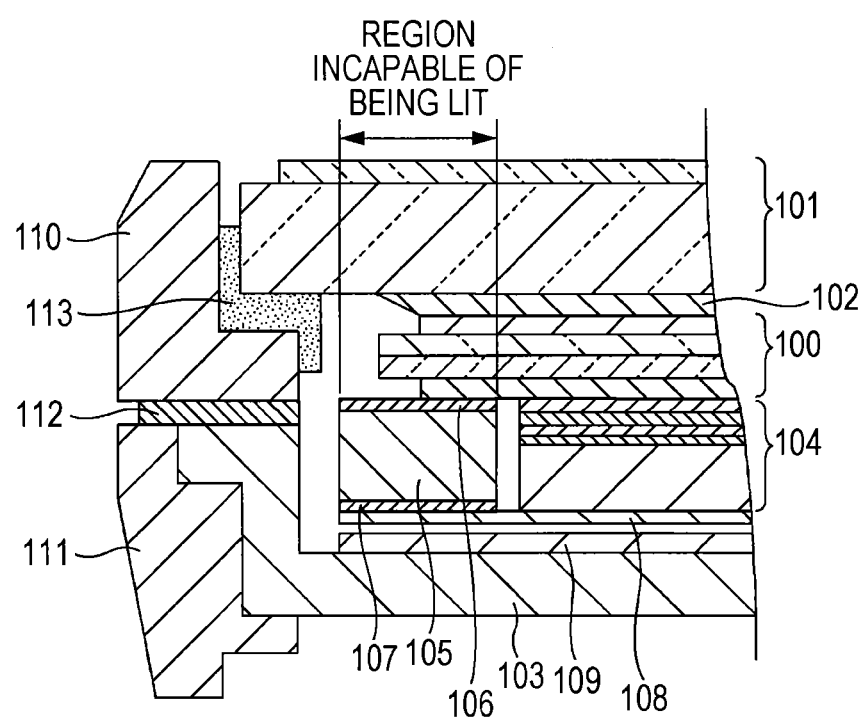
FIG. 32 is a cross-sectional view obtained by cutting away a conventional cellular phone along the transverse direction.

In the case of the cellular phone according to the present fifteenth embodiment, as illustrated in FIG. 30, the side cabinet 21 is formed integral with the rear frame 70, and the backlight unit 15 is stored and protected by a portion equivalent to the rear frame 70 of the side cabinet 21.

A in FIG. 31 through F in FIG. 31 illustrate the assembly process of the rear cabinet assembly of the cellular phone according to the present fifteenth embodiment.

First, in the case of assembling the rear cabinet assembly of the cellular phone according to the present fifteenth embodiment, as illustrated in A in FIG. 31 and B in FIG. 31, the cushion sheet 20 and backlight unit 15 are sequentially laminated in the bottom portion 70a of the side cabinet 21.

Next, as illustrated in C in FIG. 31, the adhesive agent 24 is applied to a portion where the edge portion of the lens 12 of the display portion 2 is mounted, using the nozzle 30 subjected to bend processing of the dispenser apparatus.

Next, as illustrated in D in FIG. 31 and E in FIG. 31, the lens 12 of the display portion 2, and the display unit 11 are glued via the lamination member 13. As illustrated in F in FIG. 31, the edge portion of the lens 12 is mounted to a location where the adhesive agent 24 of the side cabinet 21 has been applied, and also the display unit 11 is mounted onto the backlight unit 15, and fixed by a tool until the adhesive agent 24 is hardened, and assembly of the rear cabinet assembly is completed.

With the cellular phone according to such a fifteenth embodiment, the side cabinet 21 and rear frame 70 have integrally been cast, and accordingly, a process for gluing the side cabinet 21 and rear frame 70 by a tape or the like can be omitted, and also, the same advantages as with the cellular phones according to the above embodiments can be obtained.

[Personal Digital Assistant Apparatuses Provided from Embodiments]

According to an embodiment of such a present disclosure, there is provided a personal digital assistant apparatus including: a display portion; a backlight unit configured to irradiate light from the rear face side of the display portion; a rear frame having height equivalent to at least the thickness of the backlight unit, and having a backlight unit protection function for protecting the backlight unit by housing; and an outer circumference casing glued to the rear frame integral with the rear frame or via an adhesion member, and provided along the outer circumference of the display portion.

Also, according to an embodiment of such a present disclosure, there is provided a personal digital assistant apparatus wherein the rear frame and the outer circumference casing are integrally formed by outsert molding or casting.

Also, according to an embodiment of such a present disclosure, there is provided a personal digital assistant apparatus wherein the backlight unit includes a light emitting unit configured to emit light, and a light guide configured to guide the light from this light emitting unit into a predetermined portion, and the rear frame has a hole portion into which a portion of the light guide of the backlight unit is inserted.

Also, according to an embodiment of such a present disclosure, there is provided a personal digital assistant apparatus wherein the rear frame is configured to be applied with an adhesive agent using a nozzle subjected to bend processing with a predetermined angle, and a portion of this rear frame to be applied with the adhesive agent has been subjected to notch processing so as to have generally the same inclination angle as the bend angle of the nozzle.

Also, according to an embodiment of such a present disclosure, there is provided a personal digital assistant apparatus wherein the rear frame has a groove portion configured to firmly fix an applied adhesive agent.

Also, according to an embodiment of such a present disclosure, there is provided a personal digital assistant apparatus wherein the outer circumference casing is formed with a rigid member, and an edge portion of the display portion is glued to the outer circumference casing and the rear frame by this adhesive agent so as to come into contact with the outer circumference casing and the rear frame via an adhesive agent which maintains predetermined elasticity even after hardening.

Also, according to an embodiment of such a present disclosure, there is provided a personal digital assistant apparatus wherein the outer circumference casing has an adhesive agent holding unit configured to hold the applied adhesive agent in a predetermined location.

Also, according to an embodiment of such a present disclosure, there is provided a personal digital assistant apparatus wherein the outer circumference casing of which the entire shape is a rectangular shape surrounding the circumference of the display portion, and the cross section of each side portion has a generally L-letter shape, and the groove-shaped adhesive agent holding unit is provided along the inner circumference wall portion of this outer circumference casing so as to have the depth of the width direction of the outer circumference casing.

Also, according to an embodiment of such a present disclosure, there is provided a personal digital assistant apparatus wherein the groove-shaped adhesive agent holding unit is continuously or intermittently provided to each side portion of the rectangular outer circumference casing, or continuously or intermittently provided to only a transverse side portion of the rectangular outer circumference casing, or continuously or intermittently provided to only a longitudinal side portion of the rectangular outer circumference casing.

Also, according to an embodiment of such a present disclosure, there is provided a personal digital assistant apparatus wherein the groove-shaped adhesive agent holding unit is provided to each longitudinal side portion of the rectangular outer circumference casing so that the depth gradually deepens from one transverse side portion to the center of a longitudinal side portion, and the depth gradually shallows from the center of a longitudinal side portion to the other transverse side portion.

Also, according to an embodiment of such a present disclosure, there is provided a personal digital assistant apparatus wherein the outer circumference casing of which the entire shape is a rectangular shape surrounding the circumference of the display portion, and the cross section of each side portion has a generally L-letter shape, and the groove-shaped adhesive agent holding unit is provided along the bottom side portion of this outer circumference casing so as to have the depth in the thickness direction of the outer circumference casing.

Also, according to an embodiment of such a present disclosure, there is provided a personal digital assistant apparatus wherein the outer circumference casing of which the entire shape is a rectangular shape surrounding the circumference of the display portion, and the cross section of each side portion has a generally L-letter shape, and the groove-shaped adhesive agent holding unit is formed by subjecting the bottom side portion of the outer circumference casing to diagonal notch processing.

Also, according to an embodiment of such a present disclosure, there is provided a personal digital assistant apparatus wherein the outer circumference casing of which the entire shape is a rectangular shape surrounding the circumference of the display portion, and the inner circumference wall portion thereof has been subjected to inclination processing so as to have the same inclination angle as the bend angle of a nozzle of a dispenser apparatus for applying the adhesive agent.

Also, according to an embodiment of such a present disclosure, there is provided a personal digital assistant apparatus wherein the outer circumference casing of which the entire shape is a rectangular shape surrounding the circumference of the display portion, and the inner circumference wall portion thereof has been subjected to inclination processing so as to have the same inclination angle as the bend angle of a nozzle of a dispenser apparatus for applying the adhesive agent, and an edge portion of the display portion has also been subjected to inclination processing so as to have the same inclination angle as the bend angle of a nozzle of the dispenser apparatus.

Also according to an embodiment of such a present disclosure, there is provided (1) a personal digital assistant apparatus including: a display portion; a backlight unit configured to irradiate light from a rear face side of the display portion; a rear frame having height equivalent to at least a thickness of the backlight unit, and configured to protect the backlight unit; and an outer circumference casing attached to the rear frame, or formed integrally with the rear frame, and provided along an outer circumference of the display portion.

(2) The information processing apparatus of (1), wherein the outer circumference casing is attached to the rear frame with an adhesive.

(3) The information processing apparatus of (1), wherein the outer frame is formed integrally with the rear frame by outsert molding or casting.

(4) The information processing apparatus of (1), wherein the backlight unit includes a light emitting unit configured to emit light, and a light guide configured to guide light emitted from the light emitting unit into a predetermined portion.

(5) The information processing apparatus of (4), wherein the rear frame includes an opening into which a portion of the light guide is inserted.

(6) The information processing apparatus of (1), wherein the rear frame includes a groove portion configured to fix an applied adhesive agent.

(7) The information processing apparatus of (1), wherein the outer circumference casing is formed of a rigid member, and an edge portion of the display portion is adhered to the outer circumference casing and the rear frame by an adhesive agent.

(8) The information processing apparatus of (7), wherein the outer circumference casing includes an adhesive agent holding portion configured to hold the adhesive agent in a predetermined location.

(9) The information processing apparatus of (1), wherein the outer circumference casing has a substantially rectangular shape surrounding the outer circumference of the display portion, and a cross section of each side portion of the outer circumference casing is substantially L-shaped.

(10) The information processing apparatus of (1), wherein the rear frame includes a notch portion on at least one transverse side on which a flexible substrate of the backlight unit is disposed.

(11) The information processing apparatus of (10), wherein the backlight unit includes a light emitting element, a light guide, an optical plate and the flexible substrate, and a cushion sheet, a reflector, the light guide, the light emitting element and the optical plate are sequentially disposed on a surface of the rear frame.

(12) The information processing apparatus of (11), wherein the light guide and light emitting element are disposed so as to be in contact with the flexible substrate.

(13) The information processing apparatus of (5), wherein the rear frame includes a notch portion in which a light emitting element of the backlight unit is disposed, and a flexible substrate of the backlight unit is disposed above the notch portion of the rear frame and in contact with the light emitting element.

(14) The information processing apparatus of (13), wherein the backlight unit includes the light emitting element, a light guide, an optical plate and the flexible substrate, and a reflector and the light guide plate are disposed in the opening of the rear frame.

(15) The information processing apparatus of (14), wherein the light guide and light emitting element are disposed so as to be in contact with the flexible substrate.

(16) The information processing apparatus of (1), wherein an edge portion of the rear frame that is adhered to the display portion is inclined at a predetermined angle.

(17) The information processing apparatus of (1), wherein an edge portion of the rear frame that is adhered to the display portion includes a plurality of notches configured to receive an adhesive agent.

(18) The information processing apparatus of (1), wherein an outer wall portion side of the rear frame is directly adhered to an inner wall of the outer circumference casing.

(19) The information processing apparatus of (1), wherein a bottom outer wall portion of the rear frame is directly adhered to an inner wall of the outer circumference casing.

(20) The information processing apparatus of (1), wherein an upper wall portion of the rear frame is directly adhered to a bottom wall of the outer circumference casing.

MODIFICATION

Though the above embodiments are embodiments wherein the present disclosure has been applied to a cellular phone, the present disclosure can be applied to electronic device including a display portion, for example, such as PHS phones (PHS: Personal Handyphone System), PDA apparatuses (PDA: Personal Digital Assistant), electronic camera apparatuses, electronic video camera apparatuses, portable game machines, notebook-type personal computer devices, and so forth. The same advantages as with the above embodiments can be obtained in any of these cases.

Finally, embodiments other than the above embodiments may be made as an embodiment of the present disclosure by various modifications, various combinations, and so forth according to design or other factors within the scope of the Claims of the present disclosure or equivalent to the Claims. Therefore, the present disclosure is not restricted to the above embodiments. This will be understood by one skilled in the art as a matter of course.

The invention claimed is:

1. An information processing apparatus comprising:
   a display portion including an edge portion having two intersecting surfaces;
   a backlight unit configured to irradiate light from a rear face side of the display portion;
   a rear frame having height equivalent to at least a thickness of the backlight unit, and configured to protect the backlight unit; and
   an outer circumference casing attached to the rear frame, or formed integrally with the rear frame, and provided along an outer circumference of the display portion, the outer circumference casing defining a thickness dimension, a transverse dimension, and a longitudinal dimension and being longer in the longitudinal dimension than in the thickness dimension and longer in the longitudinal dimension than in the transverse dimension,
   wherein the outer circumference casing is formed of a rigid member and includes an intersection of two surfaces forming an edge parallel to the longitudinal dimension, one of the two surfaces of the outer circumference casing has at least one groove portion formed therein, and the edge portion of the display portion is adhered to the outer circumference casing by an adhesive agent which is formed on both of the two surfaces of the outer circumference casing to contact both of the two surfaces of the edge portion of the display portion,
   wherein the at least one groove portion has a first end portion, a center portion, and a second end portion that are separated in a direction parallel to the edge and to the longitudinal dimension, the at least one groove portion having a depth that gradually increases from the first end portion to the center portion and gradually decreases from the center portion to the second end portion, and wherein the at least one groove portion is an adhesive agent holding unit for fixing the adhesive agent between the outer circumference casing and the display portion.

2. The information processing apparatus of claim 1, wherein the outer circumference casing is attached to the rear frame with an additional adhesive.

3. The information processing apparatus of claim 1, wherein
   the outer circumference casing is formed integrally with the rear frame by outsert molding or casting.

4. The information processing apparatus of claim 1, wherein
   the backlight unit includes a light emitting unit configured to emit light, and a light guide configured to guide light emitted from the light emitting unit into a predetermined portion.

5. The information processing apparatus of claim 4, wherein
   the rear frame includes an opening into which a portion of the light guide is inserted.

6. The information processing apparatus of claim 5, wherein
   the rear frame includes a notch portion in which a light emitting element of the backlight unit is disposed, and a flexible substrate of the backlight unit is disposed above the notch portion of the rear frame and in contact with the light emitting element.

7. The information processing apparatus of claim 6, wherein
   the backlight unit includes the light emitting element, a light guide, an optical plate and the flexible substrate, and
   a reflector and the light guide are disposed in the opening of the rear frame.

8. The information processing apparatus of claim 7, wherein
   the light guide and light emitting element are disposed so as to be in contact with the flexible substrate.

9. The information processing apparatus of claim 1, wherein
   the rear frame includes a groove portion configured to fix the adhesive agent.

10. The information processing apparatus of claim 1, wherein
    the outer circumference casing includes an adhesive agent holding portion configured to hold the adhesive agent in a predetermined location.

11. The information processing apparatus of claim 1, wherein
    the outer circumference casing has a substantially rectangular shape surrounding the outer circumference of the display portion, and a cross section of each side portion of the outer circumference casing is substantially L-shaped.

12. The information processing apparatus of claim 1, wherein
    the rear frame includes a notch portion on at least one transverse side on which a flexible substrate of the backlight unit is disposed.

13. The information processing apparatus of claim 12, wherein
    the backlight unit includes a light emitting element, a light guide, an optical plate and the flexible substrate, and a cushion sheet, a reflector, the light guide, the light emitting element and the optical plate are sequentially disposed on a surface of the rear frame.

14. The information processing apparatus of claim 13, wherein the light guide and light emitting element are disposed so as to be in contact with the flexible substrate.

* * * * *